(12) United States Patent
Liu et al.

(10) Patent No.: US 12,051,221 B2
(45) Date of Patent: Jul. 30, 2024

(54) METHOD AND APPARATUS FOR POSE IDENTIFICATION

(71) Applicant: SAMSUNG ELECTRONICS CO., LTD., Suwon-si (KR)

(72) Inventors: Zhihua Liu, Beijing (CN); Yamin Mao, Beijing (CN); Hongseok Lee, Seoul (KR); Paul Oh, Seongnam-si (KR); Qiang Wang, Beijing (CN); Yuntae Kim, Suwon-si (KR); Weiheng Liu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 17/468,984

(22) Filed: Sep. 8, 2021

(65) Prior Publication Data
US 2022/0076448 A1    Mar. 10, 2022

(30) Foreign Application Priority Data

Sep. 8, 2020 (CN) .......................... 202010937504.1
May 25, 2021 (CN) .......................... 202110572180.0
Jul. 8, 2021 (KR) .......................... 10-2021-0089937

(51) Int. Cl.
*G06T 7/73* (2017.01)
*G06T 3/4038* (2024.01)
*G06T 7/50* (2017.01)

(52) U.S. Cl.
CPC .............. *G06T 7/75* (2017.01); *G06T 3/4038* (2013.01); *G06T 7/50* (2017.01); *G06T 2207/10028* (2013.01); *G06T 2207/20221* (2013.01)

(58) Field of Classification Search
CPC ... G06T 2207/10028; G06T 7/73; G06T 7/50; G06T 7/70; G06T 7/593;
(Continued)

(56) References Cited

U.S. PATENT DOCUMENTS

2011/0305370 A1* 12/2011 Choi .......................... G06T 7/55
                                                      382/106
2013/0071009 A1* 3/2013 Ha ............................ G06T 7/97
                                                      382/154

(Continued)

FOREIGN PATENT DOCUMENTS

CN   110335316 A  * 10/2019  ............. G01C 25/00
CN   111062261 A  *  4/2020  ......... G06K 9/00375

(Continued)

OTHER PUBLICATIONS

Xiong et al., "A2J: Anchor-to-Joint Regression Network for 3D Articulated Pose Estimation from a Single Depth Image," IEEE/CVF International Conference on Computer Vision (ICCV), 2019, pp. 793-802.

(Continued)

*Primary Examiner* — Ian L Lemieux
*Assistant Examiner* — Woo C Rhim
(74) *Attorney, Agent, or Firm* — Sughrue Mion, PLLC

(57) ABSTRACT

Disclosed is a pose identification method including obtaining a depth image of a target, obtaining feature information of the depth image and position information corresponding to the feature information, and obtaining a pose identification result of the target based on the feature information and the position information.

20 Claims, 26 Drawing Sheets

(58) Field of Classification Search
CPC ....... G06T 2207/10012; G06T 2200/08; G06T 2200/04; G06T 7/75; G06T 3/4038; G06T 2207/20221; G06F 18/253; G06V 10/44; G06V 10/40; G06V 40/20; G06V 40/28; G06V 10/7715; G06V 2201/12; G06V 10/82; G06V 40/107
See application file for complete search history.

(56) References Cited

U.S. PATENT DOCUMENTS

| | | | |
|---|---|---|---|
| 2014/0204015 | A1 | 7/2014 | Lee et al. |
| 2017/0277942 | A1 | 9/2017 | Lerner et al. |
| 2019/0220992 | A1* | 7/2019 | Li ............................... G06T 7/60 |
| 2019/0347823 | A1* | 11/2019 | Yang ...................... G06V 40/10 |
| 2020/0184721 | A1 | 6/2020 | Ge et al. |
| 2020/0349772 | A1* | 11/2020 | Tkach ..................... G06V 20/20 |
| 2021/0124425 | A1* | 4/2021 | Liu .......................... G06V 40/28 |
| 2022/0277475 | A1* | 9/2022 | Zhou ...................... G06V 40/11 |
| 2022/0277580 | A1* | 9/2022 | Zhou ...................... G06T 3/4046 |
| 2022/0343687 | A1* | 10/2022 | Zhou .......................... G06T 7/50 |
| 2022/0351405 | A1* | 11/2022 | Zhou .......................... G06F 3/01 |
| 2022/0358326 | A1* | 11/2022 | Zhou .......................... G06T 7/73 |

FOREIGN PATENT DOCUMENTS

| | | | | |
|---|---|---|---|---|
| CN | 111862213 A | * | 10/2020 | |
| CN | 111476841 B | * | 12/2020 | |
| CN | 110517319 B | * | 3/2022 | ............. G06F 18/22 |
| CN | 111582207 B | * | 8/2023 | ......... G06K 9/00362 |
| KR | 10-2017-0088315 A | | 8/2017 | |

OTHER PUBLICATIONS

Gu et al., "Cascade Volume for High-Resolution Multi-View Stereo and Stereo Matching," IEEE/CVF Conference on Computer Vision and Pattern Recognition (CVPR), 2020, pp. 2495-2504.

Huang et al., "AWR: Adaptive Weighting Regression for 3D Hand Pose Estimation," Association for the Advancement of Artificial Intelligence (AAAI), 2020, total 8 pages.

Communication issued Feb. 1, 2022 by the European Patent Office for European Patent Application No. 21195357.5.

Ge et al., "Hand PointNet: 3D Hand Pose Estimation Using Point Sets", 2018, 2018 IEEE/CVF Conference on Computer Vision and Pattern Recognition, 10 pages total, XP033473765.

Ge et al., "Robust 3D Hand Pose Estimation From Single Depth Images Using Multi-View CNNs", 2018, IEEE Transaction on Image Processing, 15 pages total, XP011884554.

* cited by examiner

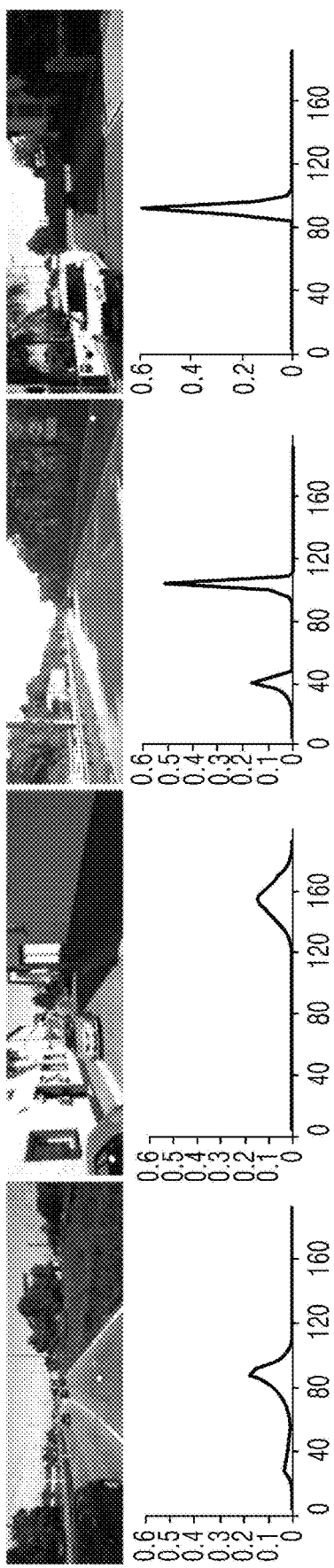

METHOD AND APPARATUS FOR POSE IDENTIFICATION

CROSS-REFERENCE TO RELATED APPLICATION(S)

This application is based on and claims priority under 35 U.S.C. § 119 to Chinese Patent Application Nos. 202010937504.1 and 202110572180.0, filed on Sep. 9, 2020 and May 25, 2021, respectively, in the China National Intellectual Property Administration, and Korean Patent Application No. 10-2021-0089937, filed on Jul. 8, 2021, in the Korean Intellectual Property Office, the disclosures of which are incorporated by reference herein in their entireties.

BACKGROUND

1. Field

The present disclosure relates to computer technology, and more particularly, to a pose identification method, apparatus, electronic device, and computer-readable recording medium.

2. Description of Related Art

Human-machine interaction is the path for exchanging information between humans and computers, wherein a computer may understand a human input to the computer through a preset interaction interface and a pose of a human body part displayed on the interaction interface. Specifically, the computer receives a depth image including a human body part, performs feature extraction on the depth image, and then, identifies a pose of the human body part using the extracted feature. However, there is a limit to the pose-related information included in the features extracted through pose identification methods, which leads to a decrease in the precision of the final pose identification result. Therefore, there is a need to improve the pose identification methods.

SUMMARY

The present disclosure provides a pose identification method and apparatus. In addition, the present disclosure provides a computer-readable recording medium in which a program for executing the method on a computer is recorded.

Additional aspects will be set forth in part in the description which follows and, in part, will be apparent from the description, or may be learned by practice of the presented embodiments of the disclosure.

According to an aspect of an example embodiment, a pose identification method may include obtaining a depth image of a target, obtaining feature information of the depth image and position information corresponding to the feature information, and obtaining a pose identification result of the target based on the feature information and the position information.

According to another aspect of an example embodiment, a pose identification apparatus may include a processor configured to acquire a depth image of a target, acquire feature information of the depth image and position information corresponding to the feature information, and acquire a pose identification result of the target based on the feature information and the position information.

According to another aspect of an example embodiment, an electronic device may include a memory and a processor, wherein the memory may store a computer program, and the processor may execute the computer program to obtain a depth image of a target, obtain feature information of the depth image and position information corresponding to the feature information, and obtain a pose identification result of the target based on the feature information and the position information.

According to another aspect of an example embodiment, a non-transitory computer-readable medium may store a computer program that, when executed by a processor, causes the processor to obtain a depth image of a target, obtain feature information of the depth image and position information corresponding to the feature information, and obtain a pose identification result of the target based on the feature information and the position information.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A to 12D are diagrams illustrating a probability distribution according to a disparity dimension of a single pixel in an embodiment of the present disclosure;

DETAILED DESCRIPTION

Figure 1:
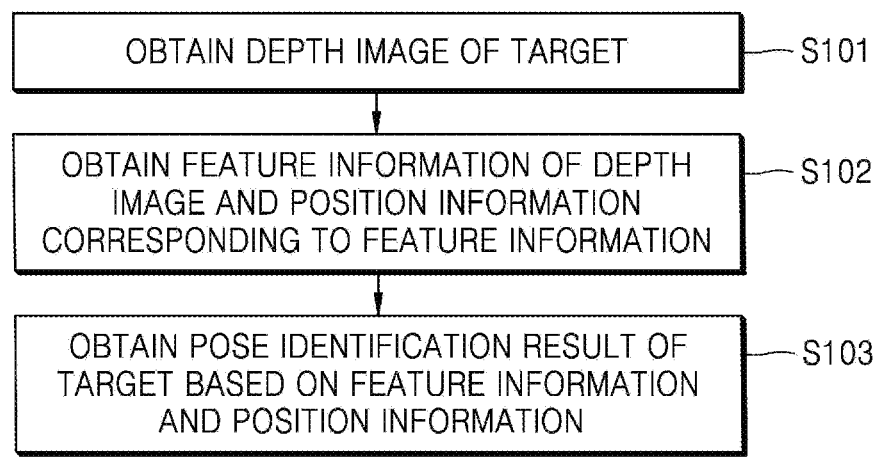
FIG. 1 is a diagram illustrating a flowchart of a pose identification method according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Embodiments of the present disclosure are described in detail below, and examples of this embodiment are shown in the drawings, and the same or similar reference numerals from beginning to end indicate the same or similar elements or elements having the same or similar functions. The embodiments described below with reference to the drawings are exemplary and are only for the purpose of description of the present disclosure, and should not be construed as limiting the present disclosure.

For those skilled in the art, the singular forms "a", "an", and "the" used herein may include the plural forms, unless otherwise specified. Furthermore, the word "includes" as used in the description of this disclosure indicates that the feature, integer, step, operation, element and/or component is present, but it should be understood that this does not exclude the addition or presence of one or more other features, integers, steps, operations, elements, components, and/or groups thereof. When an element is said to be "connected" or "coupled" to another element, it should be understood that the element may be directly connected or coupled to the other element, or intermediate elements may be present. In addition, "connection" or "coupling" as used herein may include wireless connection or wireless coupling.

In order to add clarity to the technical solutions and advantages of the present disclosure, embodiments of the present disclosure will be described in more detail below with reference to the accompanying drawings.

In the related art, the pose identification method based on the depth image acquires a low-resolution high-dimensional feature image by performing feature extraction using a 2-Dimensional Convolution Neural Network (2D CNN), and a feature of each position in the corresponding low-resolution high-dimensional feature image corresponds to an input texture having a relatively large area in the depth image. That is, because it is impossible to determine the correspondence between the features of each position in the low-resolution high-dimensional feature image obtained by feature extraction and the texture in the depth image and it is impossible to obtain specific position information of the feature, this causes a decrease in the precision of pose recognition. In addition, the related art pose identification method has the following problems. First, it is difficult to satisfy the vast amount of storage space required for memory for high-precision depth estimation, and it is difficult to meet the balance between precision and speed of depth estimation. Thus, it is difficult to acquire high-precision depth images for pose identification. Second, it is difficult to satisfy the requirements for both precision and efficiency of the existing pose identification network. Specifically, the feature extraction method based on 2D CNN views the input depth map as a traditional 2D image and processes the 2.5D depth image using the same convolution structure as the RGB image. This method cannot effectively use the depth information provided by the depth image. Although the feature extraction method based on PointNet can extract 3D structure information, 3D structure information is implicitly expressed in the network, and is disadvantageous for analysis and design. In addition, since the PointNet method first needs to transform the input data into an unordered 1D vector, the adjacency relationship of the data itself is damaged. Although modeling can be performed on 2.5D depth data based on 3D CNN, the 3D CNN requires more memory and computational parameters because 3D CNN processes one dimension more than 2D CNN. These additional dimensions require additional calculations from 10 to 100 times, and in order to reduce the time complexity and space complexity caused by this, in general, the resolution of the feature map performed by the 3D CNN is very low compared to the 2D CNN. For the above-described problem, an embodiment of the present disclosure provides a pose identification method.

FIG. 1 is a diagram illustrating a flow of a pose identification method according to an embodiment of the present disclosure. As shown in FIG. 1, the method may include the following operations.

In operation S101, a depth image of a target is obtained.

Here, the target may be a part of the human body such as, for example, a hand. Specifically, in the above operation, a depth image including the target is obtained. For example, a depth image including a hand is acquired.

In operation S102, feature information of the depth image and position information corresponding to the feature information are obtained.

Specifically, for a depth image including a target, feature information corresponding to the depth image is extracted, and at the same time, position information of a feature of each position is obtained from the feature information, and the position information may be the position coordinates of the feature, and as described in more detail, it may be the 3D position coordinates of the feature.

In operation S103, a pose identification result of the target is obtained based on the feature information and the position information.

Specifically, a pose identification result is obtained based on the feature information obtained by feature extraction and the position information corresponding to the feature of each position in the feature information. That is, feature information is used in the pose identification process, and in addition, position information corresponding to the feature of each position is used in the feature information, so that input information is added during the feature identification process.

Figure 2A:
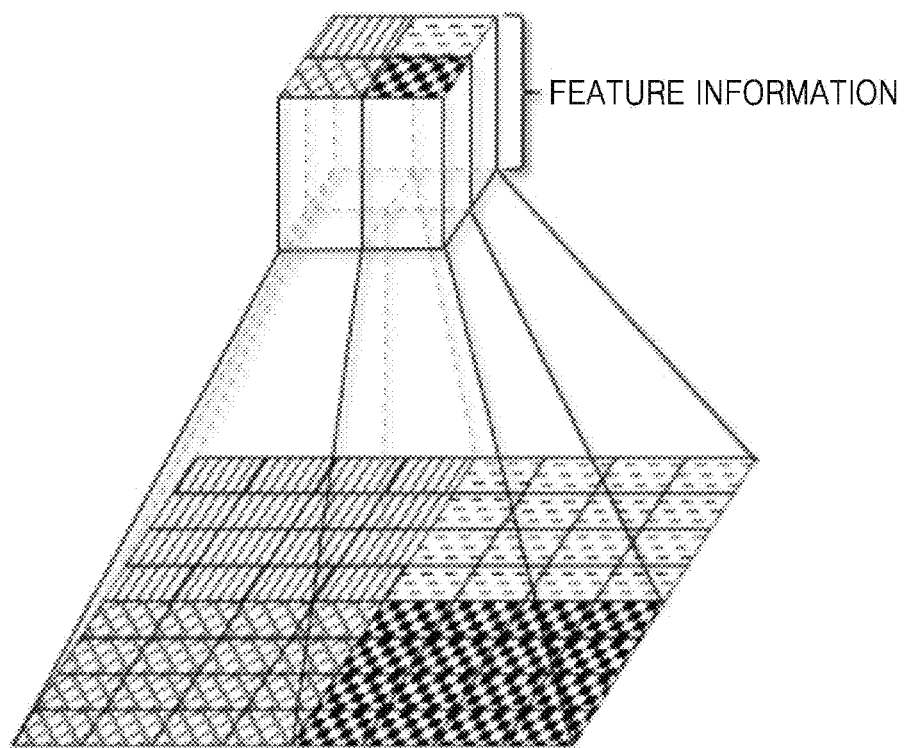
FIG. 2A is a diagram illustrating a correspondence relationship between positions among low-resolution high-dimensional feature information and depth images obtained in the related art.
Figure 2B:
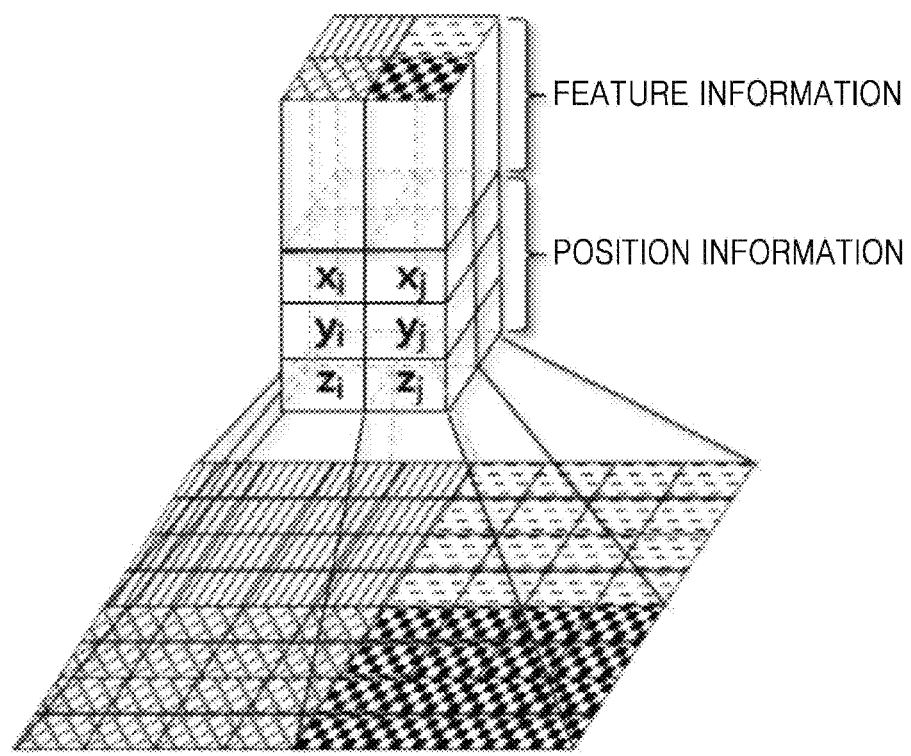
FIG. 2B is a diagram illustrating low-resolution high-dimensional feature information extracted in an embodiment of the present disclosure.
Figure 2C:
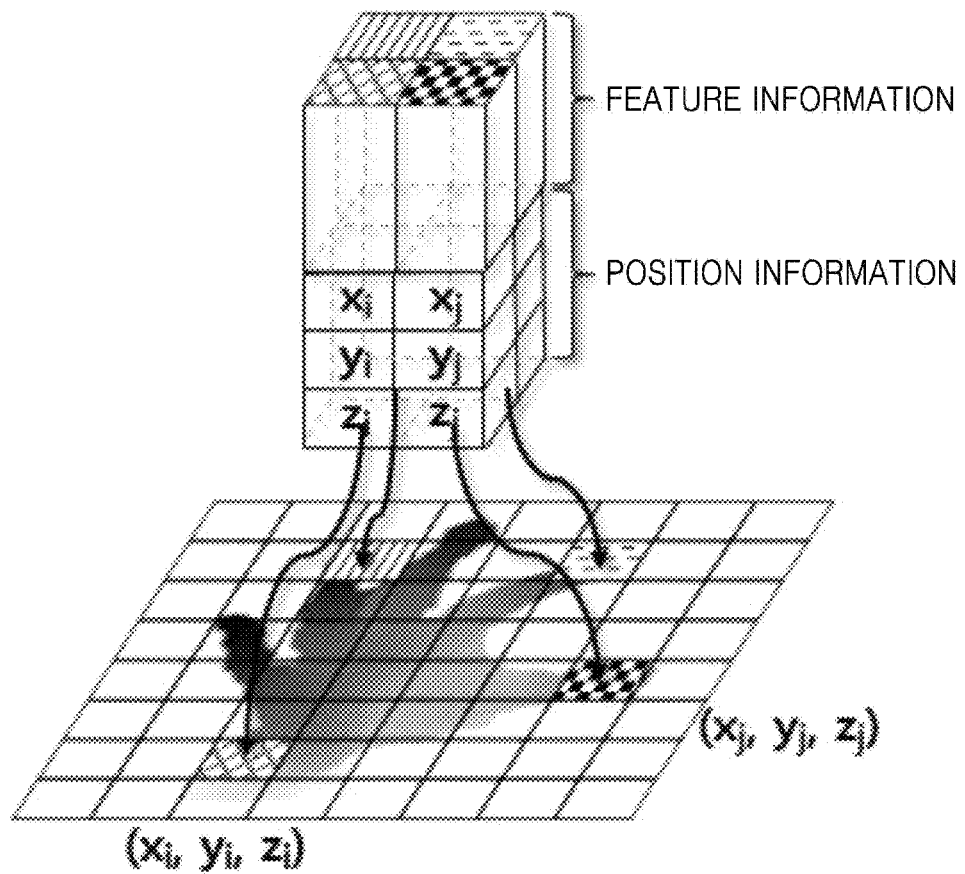
FIG. 2C is a diagram illustrating a correspondence relationship between positions among low-resolution high-dimensional feature information and depth images obtained in the related art.

For example, during hand part pose identification, FIG. 2A shows feature information without position information in the related art, and because this feature information corresponds to the input texture of a relatively large area in the depth image, in the low-resolution high-dimensional feature map obtained by feature extraction, the correspondence between the features of each position and the texture in the depth image cannot be identified. FIG. 2B shows feature information having position information obtained through a method according to an embodiment of the present disclosure (it can be seen that position coordinates respectively corresponding to features of two positions are $(x_i, y_i, z_i)$ and $(x_j, y_j, z_j)$. According to FIG. 2B, as shown in FIG. 2C, the pose identification apparatus may determine (or identify) a correspondence between a feature of each position in the feature information and a specific position in the depth image. That is, according to an embodiment of the present disclosure, the pose identification apparatus may further acquire the corresponding position coordinates (which can be interpreted as 3D coordinates) in the depth image for each position feature in the low-resolution high-dimensional feature map, and in this way, based on these position coordinates in the pose identification process, position information of the features of each position can be further used, and pose identification precision can be further improved.

According to the method provided by the present disclosure, by obtaining the position information corresponding to the feature information while the pose identification apparatus acquires the feature information of the depth image, in the pose identification process, specific position information corresponding to the features of each position can be fully utilized in the feature information, and the accuracy of pose identification is improved.

In an embodiment of the present disclosure, obtaining feature information of a depth image and position information corresponding to the feature information includes: obtaining, based on the depth image, an initial 3D coordinate map corresponding to the depth image; obtaining feature information by performing feature extraction on the depth image at least once, and feature down-sampling on the depth image at least once based on a cumulative weight corresponding to the depth image; and obtaining position information by performing coordinate down-sampling on the first 3D coordinate map based on the accumulated weight corresponding to the feature down-sampling each time feature down-sampling is performed.

Here, the cumulative weight used in the feature down-sampling in each session is a weight corresponding to the feature of each position in the feature down-sampling region of the corresponding session.

Specifically, by performing feature extraction (at least one feature extraction and at least one feature down-sampling) on the depth image, feature information corresponding to the depth image is obtained, and in order to ensure that the position information of the feature of each position of the feature information is obtained (i.e., the 3D coordinates of the feature of each position are obtained), coordinate down-sampling may be performed at least once on the first 3D coordinate map obtained based on the depth image. Specifically, when feature down-sampling is performed, coordinate down-sampling is simultaneously performed on the coordinates of each position in the feature down-sampling region using the cumulative weight of the corresponding down-sampling feature.

Here, based on the depth image, a coordinate map having initial three dimensions, that is, three dimensions of x, y, and z, corresponding to the depth image is obtained, and the size thereof is the same as that of the depth image. The x dimension represents the abscissa in 3D coordinates, the y dimension represents the ordinate in 3D coordinates, and both x and y coordinates may be normalized within a range of [−1, 1]. It is assumed that the height of the depth image is H and the width is W, i represents the horizontal coordinate in the first 3D coordinate map, and j represents the vertical coordinate in the first 3D coordinate map. For a point (i, j) on the first 3D coordinate map, the x-dimensional coordinate value is calculated using the following formula:

$$x_{(i,j)} = \frac{i - W/2}{W/2}, i \in [0, W), j \in [0, H);$$

For a point (i, j) on the first 3D coordinate map, the y-dimensional coordinate value is calculated using the following formula:

$$y_{(i,j)} = \frac{i - H/2}{H/2}, i \in [0, W), j \in [0, H);$$

For a point (i, j) on the first 3D coordinate map, the z-dimensional coordinate value is a normalized depth value, and is specifically calculated using the following formula:

$$z_{(i,j)} = \frac{(D_{(i,j)} - D_{min}) - (D_{max} - D_{min})/2}{(D_{max} - D_{min})/2}, i \in [0, W), j \in [0, H)$$

Here, $(D_{(i,j)}$ is the depth map value captured based on the depth image, $D_{min}$ is the minimum value of the effective depth, and $D_{max}$ is the maximum value of the effective depth. The effective depth may be determined using a variety of methods. For example, during hand part pose identification, the effective depth may be determined by a preset algorithm, and may also be determined from a predetermined effective depth range of the hand after detecting the central position of the hand as shown in the following formula.

$D_{min} = z_{center} - D_{thresh}/2$ $D_{max} = z_{center} + D_{thresh}/2$

Here, $z_{center}$ is the center depth of the detected hand, and $D_{thresh}$ is the preset depth range of the hand. The center point of the hand may be a Middle Finger Metacarpophalangeal Joint (MMCP), and in this case, $z_{center}=Z_{MMCP}$, and if so, the formula can be converted as follows:

$$D_{min}=Z_{MMCP}-D_{thresh}/2$$

$$D_{max}=Z_{MMCP}+D_{thresh}/2$$

Furthermore, in an embodiment of the present disclosure, based on the pose identification network, feature information of the depth image and position information corresponding to the feature information may be obtained.

Figure 3A:
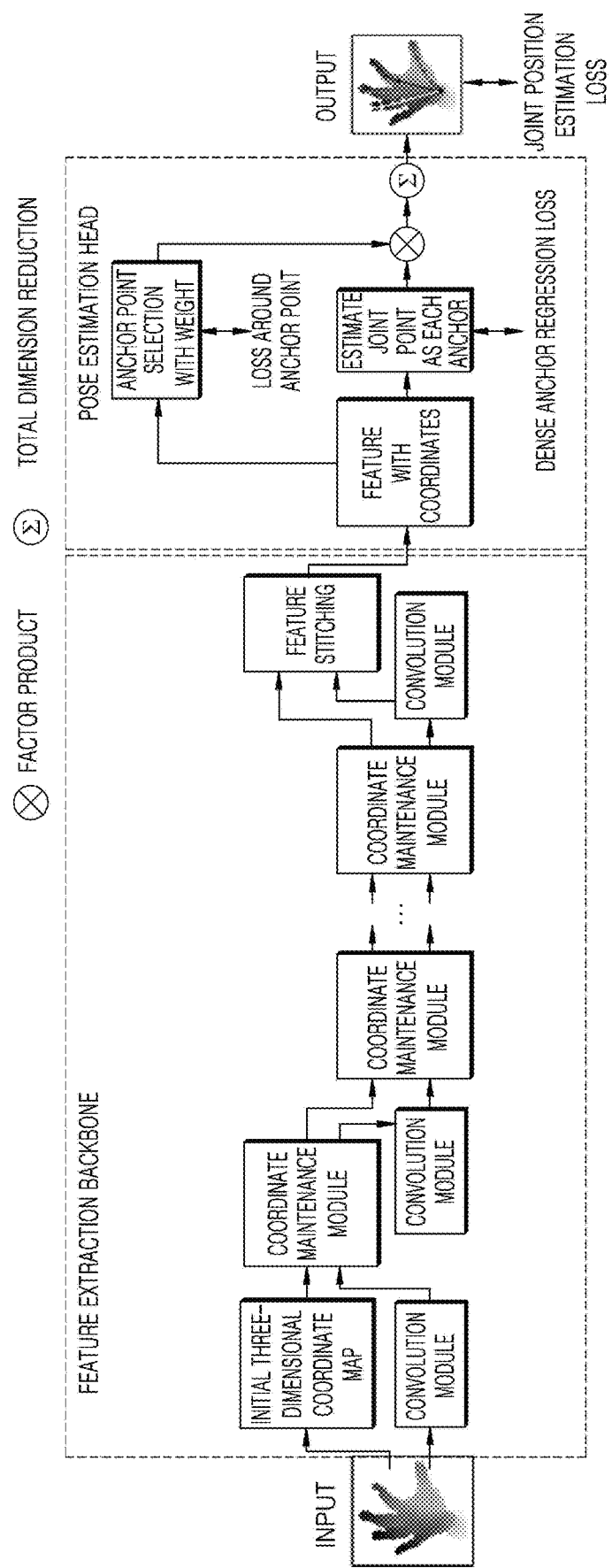
FIG. 3A is a diagram illustrating a structure of a hand part pose identification network in an example of an embodiment of the present disclosure.
Figure 3B:
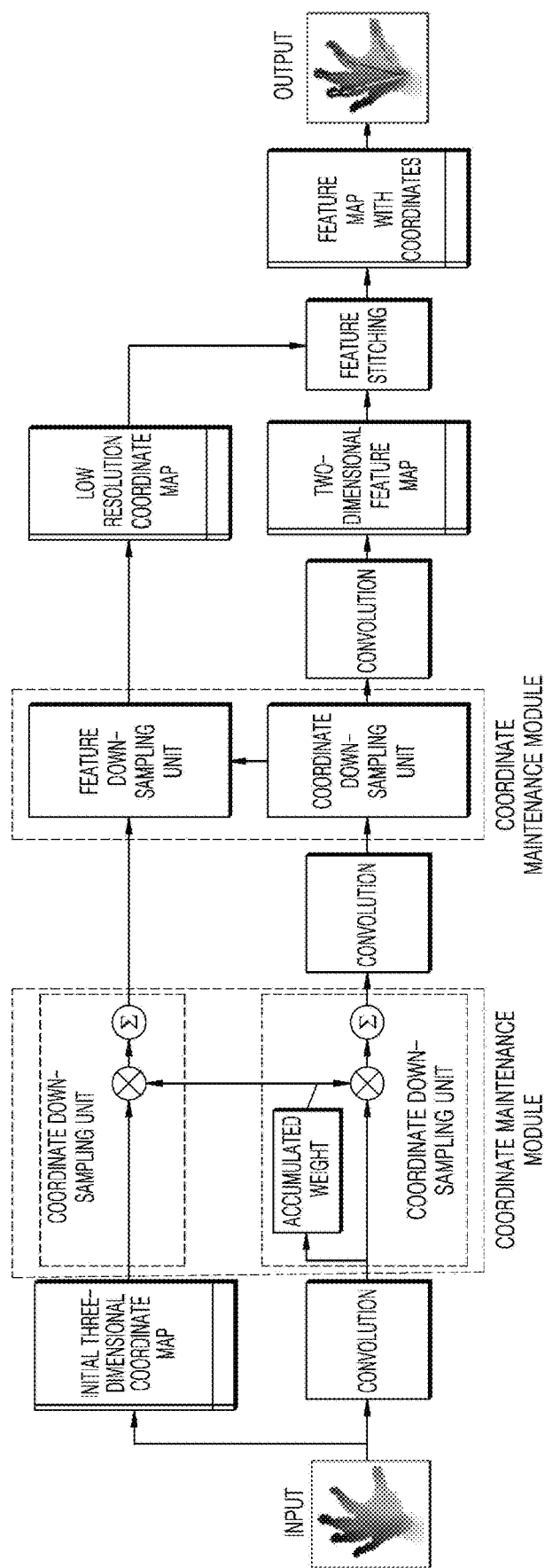
FIG. 3B is a diagram illustrating a structure of a hand part pose identification network in another example of an embodiment of the present disclosure.

Below, an embodiment of the present disclosure for performing a hand part pose identification process through a hand part pose identification network will be described in detail, and FIG. 3A is a diagram illustrating the structure of a hand part pose identification network. As shown in the figure, the hand part pose identification network includes a feature extraction backbone and a pose estimation head, and the feature extraction backbone is composed of a stacked installed convolution module and a coordinate maintenance module, and the pose identification head can use an Anchor-to-Joint (A2J) regression network. Here, as shown in FIG. 3B (only two coordinate maintenance modules are shown in the figure, but the embodiment of the present disclosure is not limited thereto), the coordinate maintenance module includes two branches, that is, a feature down-sampling unit and a coordinate down-sampling unit, and these two branches are parallel and a cumulative weight is shared by these two branches, so that a matched feature map and coordinate information (i.e., position information) can be obtained. Specifically, the convolution module is used to perform feature extraction on the input feature map corresponding to the convolution module, and the feature down-sampling unit is used to perform a feature down-sampling operation on an input feature map corresponding to the feature down-sampling unit, and in order to ensure that coordinate down-sampling and feature down-sampling are performed simultaneously, the coordinate down-sampling unit is installed to correspond one-to-one with the feature down-sampling unit, so that based on the cumulative weights corresponding to the corresponding feature down-sampling units, for a 3D coordinate map of an input feature map corresponding to a corresponding feature down-sampling unit, coordinate down-sampling may be performed simultaneously with feature down-sampling. The coordinate maintenance module is configured to perform feature down-sampling on the input feature map using spatial self-attention merging, and extract 3D coordinate information corresponding to the depth image so as to enhance the feature map 3D representation. Finally, the pose identification head returns the hand pose by inputting feature information having the above-described 3D coordinate information.

Figure 4A:
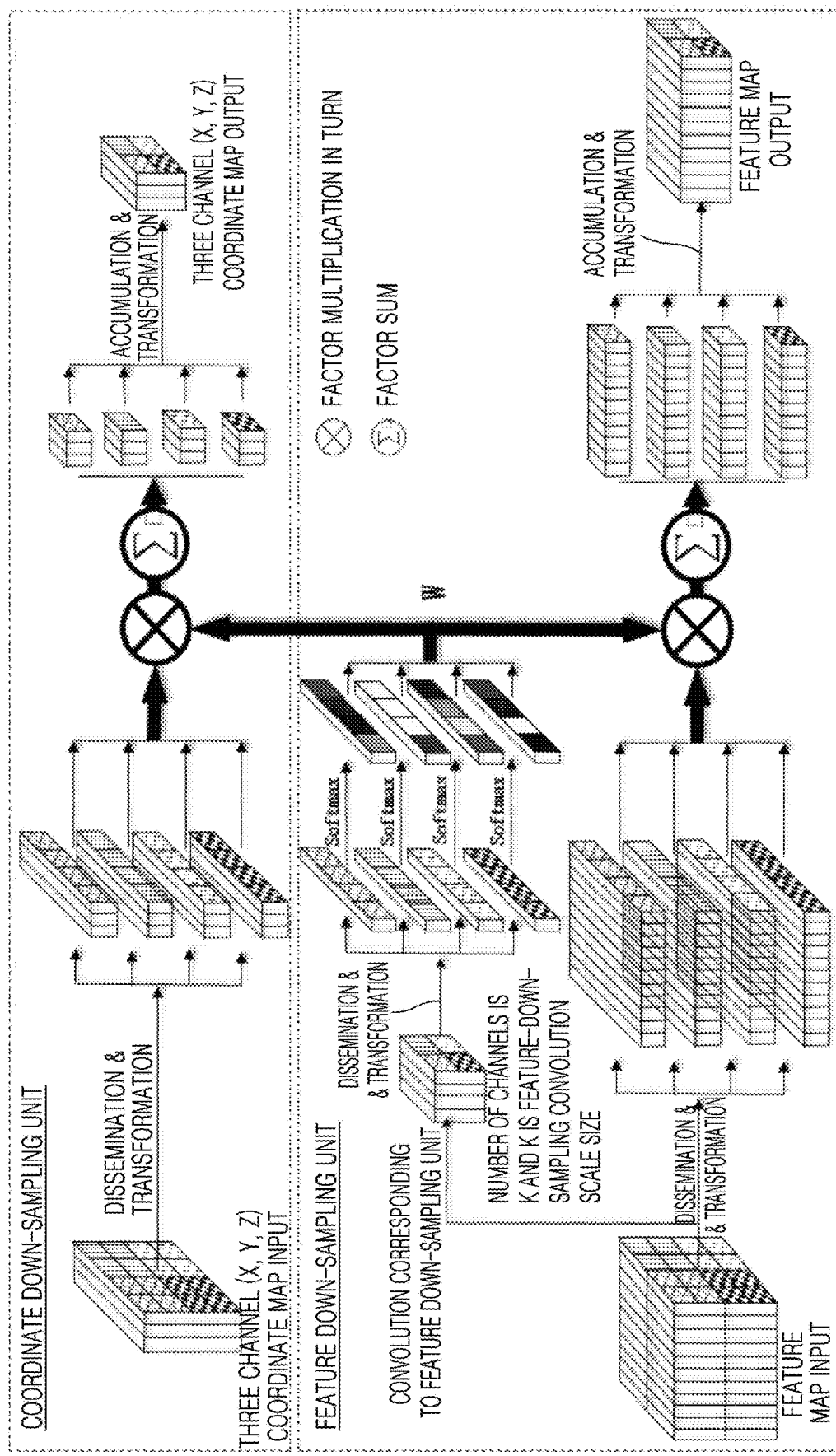
FIG. 4A is a diagram illustrating a coordinate maintenance module of FIG. 3A.

Based on the input feature map corresponding to the feature down-sampling unit and down-sampling information corresponding to the feature down-sampling unit every time the feature down-sampling is performed, cumulative weights corresponding to features of each position of the down-sampling region corresponding to feature down-sampling are obtained, and the cumulative weight is shared by the coordinate down-sampling unit corresponding to the feature down-sampling unit. FIG. 4A is a diagram illustrating a coordinate maintenance module of FIG. 3A. Here, the input feature map size is (4,4), the convolution kernel size of feature down-sampling is (2,2), and the stride is 2. First, the pose identification apparatus may perform convolution processing on an input feature map using a down-sampling sensing convolution kernel. The size, stride, and padding values of the down-sampling sensing convolution kernel and the feature down-sampling convolution kernel of the feature down-sampling unit are all the same, and at the same time, the areas of the convolution-processed output channel and the feature down-sampling region are the same, that is, k×k. Each of the feature points output after performing the above-described convolution all correspond to one feature down-sampling region of the input feature map. Each channel of each feature point corresponds to the cumulative weight of one point in the feature down-sampling region. This process can be modeled as follows:

$$z_i=\Sigma_{j\in N_i}W_{nij}x_j$$

Here, $z_i$ refers to the k×k-dimensional output of point i, $x_j$ refers to the C-dimensional input feature map, $j\in N_i$ enumerates the pooling region near point i, and $n_{ij}$ is the corresponding neighborhood, and $W_{ij}$ is the corresponding cumulative weight in the neighborhood.

Figure 4B:
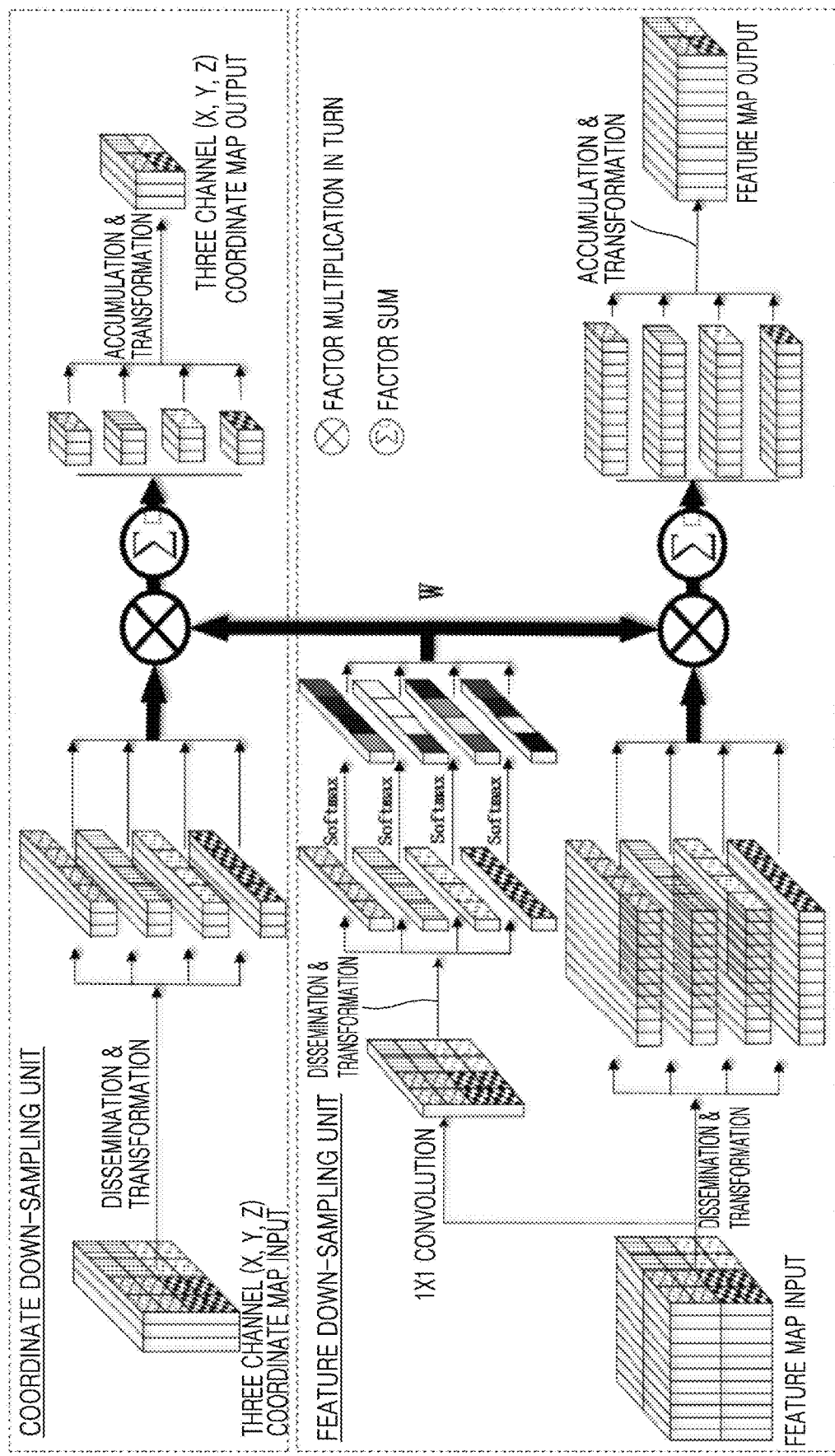
FIG. 4B is a diagram illustrating another coordinate maintenance module of FIG. 3A.

During the convolution process for obtaining the above-described cumulative weight, a 1×1 convolution kernel replaces the down-sampling sensing convolution kernel, and the corresponding coordinate maintenance module is illustrated in FIG. 4B.

Next, the pose identification apparatus performs spatial dissemination on the cumulative weights and performs normalization processing through softmax to obtain a cumulative weight $w_i$, which is as follows:

$$w_i=\text{Softmax}(z_i)$$

Further, accumulation (i.e., feature down-sampling) based on dissemination and accumulated weight is also performed on the input feature map, and the process is as follows:

$$y_i=\Sigma_{j\in N_i}(w_{ij}\cdot x_j)$$

Here, $y_i$ is the input feature whose position index is i, and $w_{ij}$ is the cumulative weight.

In the coordinate down-sampling unit, coordinate information (i.e., position information) of the output feature map of each feature down-sampling region is retained by sharing the cumulative weight. As shown at the top of FIGS. 4A and 4B, the input of the coordinate down-sampling unit is a high-resolution 3D coordinate map corresponding to the coordinate down-sampling unit and a cumulative weight corresponding to the coordinate down-sampling unit, and the pose identification apparatus obtains a 3D coordinate map corresponding to the input feature map by performing coordinate down-sampling based on the accumulated weight and the 3D coordinate map corresponding to the coordinate down-sampling unit. This process is expressed as follows:

$$c_{out,i}=\Sigma_{j\in N_i}(w_{ij}\cdot c_{in,j})$$

Here, $w_{ij}$ is a cumulative weight, $c_{in,j}$ is an input 3D coordinate, and $c_{out,i}$ is an output 3D coordinate.

Synchronizing the down-sampling process by the coordinate maintenance module is described in detail below. As shown in FIG. 4A, in the feature down-sampling unit, first, based on the down-sampling parameter of the feature down-sampling unit, a convolution operation is performed on the input feature map to obtain a multidimensional feature corresponding to the input feature map. Specifically, the convolution kernel used for the convolution operation and the convolution kernel of the feature down-sampling are the same, and the number of input channels of the convolution operation and the dimension size of the feature down-sampling region are the same. Next, region division is performed in consideration of the spatial position where feature down-sampling needs to be performed, and the input feature map and the multidimensional feature corresponding to the input feature map are disseminated and transformed, and an input feature map can be partitioned into several small sets, and a multidimensional feature can be partitioned into several corresponding small one-dimensional features. Based on the small one-dimensional features corresponding to each small set, the pose identification apparatus obtains the cumulative weight W corresponding to each small set by Softmax normalization processing for each small one-dimensional feature (i.e., acquires the cumulative weight corresponding to the features of all positions of the input feature), each small set can be accumulated as a high-dimensional feature with a spatial resolution of 1 through the cumulative weight W. Finally, each high-dimensional feature is reconstructed and transformed, and the output feature map of the feature down-sampling unit can be obtained.

As shown in FIG. 4B, in the feature down-sampling unit, first, a 1×1 convolution operation is performed on the input feature map, and a one-dimensional feature matching the input feature map size can be obtained. Next, region division is performed in consideration of the spatial position where feature down-sampling is to be performed, and the input feature map and the one-dimensional feature corresponding to the input feature map are disseminated and transformed, and an input feature map can be partitioned into several small sets, and a one-dimensional feature can be partitioned into several corresponding small one-dimensional features. Based on the small one-dimensional features corresponding to each small set, the pose identification apparatus obtains the cumulative weight W corresponding to each small set by Softmax normalization processing for each small one-dimensional feature (i.e., acquires the cumulative weight corresponding to the features of all positions of the input feature map), each small set can be accumulated as a high-dimensional feature with a spatial resolution of 1 through the cumulative weight W. Finally, each high-dimensional feature is reconstructed and transformed, and the output feature map of the feature down-sampling unit can be obtained.

In the above example, accumulating each small set as a high-dimensional feature of spatial resolution 1 through the cumulative weight W may be specifically performed by multiplying the feature of each position in each small set and the corresponding cumulative weight to obtain the sum, that is, obtaining a high-dimensional feature corresponding to the small set.

At the same time as performing feature down-sampling in the feature down-sampling unit, in the coordinate down-sampling unit, by using the accumulated weight obtained by the feature down-sampling unit, coordinate down-sampling may be performed on a 3D coordinate map corresponding to the input feature map, and the 3D coordinate map corresponding to the input feature map may be input by the upper-level coordinate down-sampling unit of the cascade. Specifically, the same dissemination and transformation processing as the input feature map may be performed on the 3D coordinate map corresponding to the input feature map, and the 3D coordinate map is divided into several small sets, and again, for each small set, accumulation is performed based on the accumulated weight corresponding to the input feature map, so that the corresponding coordinates of spatial resolution 1 can be obtained. Finally, the coordinates corresponding to each small set are reconstructed and transformed, and a 3D coordinate map corresponding to the spatial resolution of the output feature map may be obtained, that is, position information corresponding to the feature of each position in the output feature map may be obtained.

In the above example, for each small set, the accumulation is performed based on the accumulated weight corresponding to the input feature map, and coordinates of spatial resolution 1 corresponding to the input feature map can be obtained, and specifically, this may include multiplying the coordinate values of each position in each small set by the corresponding cumulative weight and then calculating the sum.

Expressions of the above-described feature extraction and coordinate down-sampling processes are respectively as follows:

$$y = \sum_{i \in \Omega} \left( \frac{e^{f(w \cdot x_i^T + b)}}{\sum_{j \in \Omega} e^{f(w \cdot x_j^T + b)}} \cdot x_i \right), x \in \mathbb{R}^n, y \in \mathbb{R}^n, w \in \mathbb{R}^n, b \in \mathbb{R}$$

$$d = \sum_{i \in \Omega} \left( \frac{e^{f(w \cdot x_i^T + b)}}{\sum_{j \in \Omega} e^{f(w \cdot x_j^T + b)}} \cdot c_i \right), c \in \mathbb{R}^3, d \in \mathbb{R}^3, w \in \mathbb{R}^3, b \in \mathbb{R}$$

Here, $x_i$, $x_j$ are the features of the input feature map, y is the features of the output feature map, ci is the position coordinates of the features in the input feature map, d is the position coordinates of the features in the output feature map, f is the nonlinear equation, w, b are the learned weights and offsets, n is the abstract feature dimension, $\Omega$ is the region where feature down-sampling is to be performed, and $f(w \cdot x^T + b)$ can also be replaced using the Multilayer Perceptron (MLP) algorithm.

The cumulative weight may be learned through the method of error backpropagation in the pose identification network learning operation. The backpropagated error may be propagated according to the coordinate down-sampling unit and the feature down-sampling unit, and thus the accumulated weight W may also be updated through these two branches. The formula is as follows:

$$\text{Delta}_1 = \frac{\partial \mathcal{L}}{\partial d} \frac{\partial d}{\partial w}$$

$$\text{Delta}_2 = \frac{\partial \mathcal{L}}{\partial y} \frac{\partial y}{\partial w}$$

$$w = w - \lambda(\lambda_1 \text{Delta}_1 + \lambda_2 \text{Delta}_2)$$

Here, $\text{Delta}_1$ is the weight gradient from the coordinate down-sampling unit branch, and $\text{Delta}_2$ is the weight gradient from the feature down-sampling unit branch, $\lambda_1$ and $\lambda_2$ are learning rates corresponding to $\text{Delta}_1$ and $\text{Delta}_2$, respectively, and A is the overall learning rate.

For pose identification heads (using Anchor-to-Joint (A2J) regression networks), a plurality of anchor points are assigned to each point on the final element map, and each anchor point can forcibly return to the in-plane offset and depth values of each joint. The UVD coordinate system can be converted to a 3D coordinate system based on the camera's intrinsic parameters, and the final positioning of several joints can be collected from the output of all anchor points. This process can be expressed as follows:

$$\begin{cases} \hat{U}_{F,j} = \sum_{i \in A} w_{ij}(U_{A,i} + \hat{U}_{o_{ij}}) \\ \hat{V}_{F,j} = \sum_{i \in A} w_{ij}(U_{A,i} + \hat{U}_{o_{ij}}) \\ \hat{D}_{F,j} = \sum_{i \in A} w_{ij}\hat{D}_{ij} \end{cases}$$

Here, i is an index, j is a joint point index, A is the entire set of anchor points, and $U_{A,i}$ and $V_{A,i}$ are preset anchor point positions. $\hat{U}_{F,j}$, $\hat{V}_{F,j}$, $\hat{D}_{F,j}$ are the estimated joint point positions. $\hat{U}_{o,ij}$, $\hat{V}_{o,ij}$, $\hat{D}_{ij}$ are estimated in-plane translation and depth values.

Figure 3C:
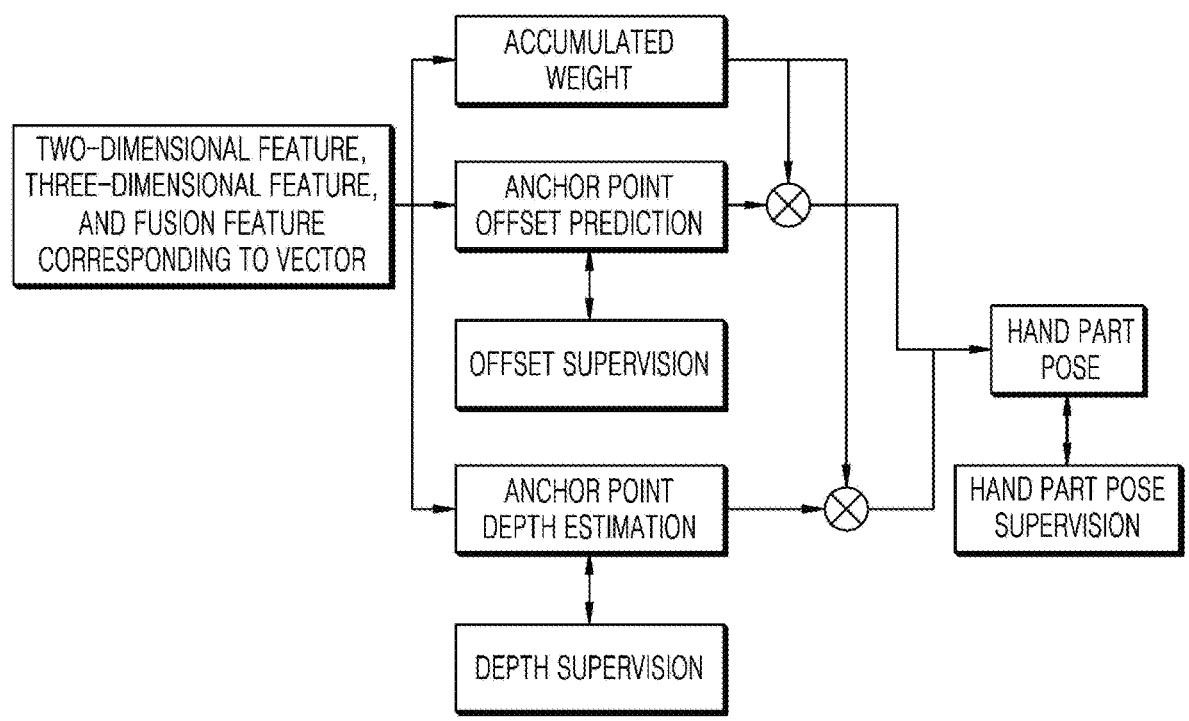
FIG. 3C is a diagram illustrating dense supervised during a network training process in one example of an embodiment of the present disclosure.

As shown in FIG. 3C, after obtaining valid features, the hand part pose is estimated, but only a simple hand part pose is supervised on the network as a supervision signal, and the network may not be sufficiently trained. Due to this, the pose identification apparatus estimates the anchor point and the joint point offset, and adds an offset-oriented supervisory signal based on accumulating the result, so that a higher precision result can be obtained, and the calculation formula of the corresponding loss function is as follows:

$$L_1 = \Sigma_{j \in \mathfrak{I}} \mathcal{L}(\Sigma_{i \in \Omega} w_{ij}(Off_{ij} + Anchor_{ij}) - GT\_P_j) + \Sigma_{j \in \mathfrak{I}}$$
$$\mathcal{L}(\Sigma_{i \in \Omega} w_{ij} d_{ij} - GT\_D_j) L_2 = \lambda(\Sigma_{j \in \mathfrak{I}} \mathcal{L}(\Sigma_{i \in \Omega}(Off_{ij} - (GT_{P_j} - Anchor_{ij}))) + \Sigma_{j \in \mathfrak{I}} \mathcal{L}(\Sigma_{i \in \Omega}(d_{ij} - GT\_D_j)))$$
$$L_{final} = L_1 + L_2$$

Here, $L_{final}$ is the overall loss function, $L_1$ is the weighted loss function for all anchor point estimation results, and $L_2$ is the dense supervised oriented loss function. j, $\mathfrak{I}$ are the joint index and joint set, i, $\Omega$ are the anchor point index and anchor point set, $w_{=ij}$ y is the cumulative weight of the ith anchor point and the j joint, $Anchor_{ij}$ is the position of the anchor point in the plane, $Off_{ij}$ is the offset amount in the plane, $d_{ij}$ is the depth estimation of the j joint of the i anchor point, $GT\_P_j$ is the label position in the j joint plane, $GT\_D_j$ is the depth of the j joint label, and $\mathcal{L}$ is the loss equation.

Further, referring back to FIG. 3A, in the training process of the hand part pose identification network, three loss functions can be set, including the joint position estimation loss, the loss around the anchor point, and the dense anchor regression loss. Specifically, the joint position estimation loss may cause the network to output the correct joint position in the last operation, and the calculation formula of the loss is as follows:

$$LOSS_{final-joint} = \Sigma_{j \in J} \mathcal{L}(\Sigma_{i \in A} w_{ij}(U_{A,i} + \hat{U}_{o,ij}) - U_{GT,j}) + \Sigma_{j \in J} \mathcal{L}(\Sigma_{i \in A} w_{ij}(V_{A,i} + \hat{V}_{o,ij}) - V_{GT,j}) + \Sigma_{j \in J} \mathcal{L}(\Sigma_{i \in A} w_{ij} \hat{D}_{ij} - D_{GT,j})$$

Here, $\mathcal{L}$ represents the loss function, and $U_{GT,j}$, $V_{GT,j}$, $D_{GT,j}$ represent the true value of the joint point position.

The loss around the anchor point can be used to enhance the generalization ability of the network, and the network is also supervised, so that an anchor point in the information around the joint can be obtained, and the calculation formula for the loss is as follows:

$$LOSS_{surrounding} = \Sigma_{i \in J} \mathcal{L}(\Sigma_{i \in A} w_{ij} U_{A,i} - U_{GT,j}) + \Sigma_{j \in J} \mathcal{L}(\Sigma_{i \in A} w_{ij} V_{A,i} - V_{GT,j})$$

The dense anchor regression loss causes each anchor point to estimate one exact joint position, and the loss may cause the feature point to extract a reasonable expression form from the input depth image. In other words, the dense anchor regression loss explicitly supervises each anchor generation process by building pixel level regression loss on the depth image and in-plane offset map, and the loss also allows each feature point to extract a reasonable representation from the input image, and the formula for calculating the loss is as follows:

$$LOSS_{anchor-joint} = \Sigma_{j \in J} \Sigma_{i \in A} \mathcal{L}((U_{A,i} + \hat{U}_{o,ij}) - U_{GT,j}) + \Sigma_{j \in J} \Sigma_{i \in A} \mathcal{L}((V_{A,i} + \hat{V}_{o,ij}) - V_{GT,j}) + \Sigma_{j \in J} \Sigma_{i \in A} \mathcal{L}(\hat{D}_{ij} - D_{GT,j})$$

For all loss functions, the weights and calculation formulas of the three loss functions are as follows:

$$Loss_{total} = \lambda_1 LOSS_{final-joint} + \lambda_2 LOSS_{surrounding} + \lambda_3 LOSS_{anchor-joint}$$

Here, the weight of each loss function may be set to $\lambda_1=3$, $\lambda_2=1$, $\lambda_3=1$, respectively.

In the pose identification method based on the existing depth image, a feature is extracted based on 2D CNN, and the input depth map is viewed as a traditional 2D image, and the 2.5-dimensional depth image is processed using the same convolution structure as the RGB image, and this method cannot effectively use the depth information provided by the depth image.

For the above-mentioned problem, in one embodiment of the present disclosure, any one time of feature extraction includes: obtaining a 3D distance corresponding to a feature of each position in the input feature map, based on the 3D coordinate map corresponding to the input feature map corresponding to the feature extraction; obtaining a distance weight corresponding to the feature of each position in the input feature map based on the 3D distance; and obtaining an output feature map corresponding to the input feature map by performing feature extraction on the input feature map based on the distance weight.

Specifically, in the feature extraction process, each convolution process adds one re-weighting process, and the distance weight used in the re-weighting process may be obtained based on the 3D coordinate map of the input feature map. Specifically, for each region of the convolution process, a 3D distance between each position in the region and a position to be output may be obtained, and a distance weight of each corresponding position may be obtained based on each 3D distance. Here, the position to be output is a position at which a feature obtained after convolution processing is positioned, for example, a position of a central point of a convolution processing region may function as a position to be output.

Figure 5:
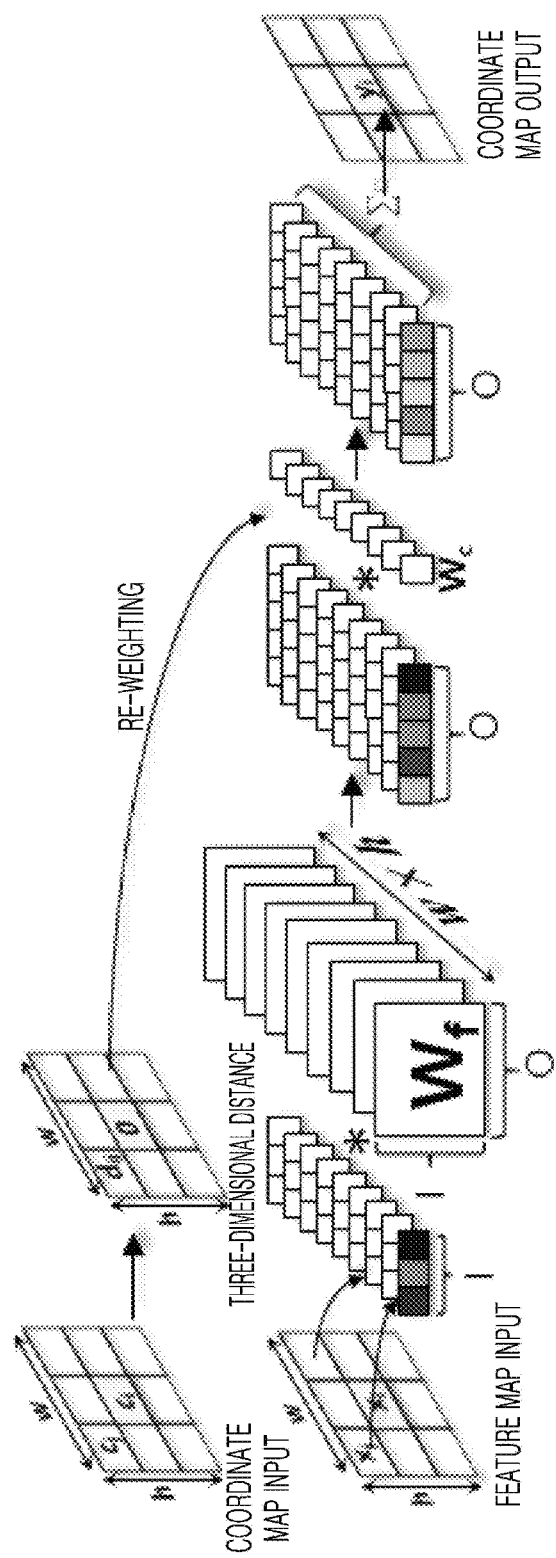
FIG. 5 is a diagram illustrating a feature extraction flow in an example of an embodiment of the present disclosure.

The pose identification apparatus may obtain the distance weight of the feature of each position among the input features through the method described above, and then, based on the distance weight, perform feature extraction on the input feature map to obtain a corresponding output feature map. Specifically, as shown in FIG. 5, first, the pose identification apparatus expands the input feature map into at least one one-dimensional vector based on the 3D coordinate map corresponding to the input feature map; next, multiplies the feature value of each feature position among each one-dimensional vector and a corresponding weight in the convolution kernel used by the feature extraction unit to obtain a corresponding one-dimensional projection vector; and finally, obtains the corresponding output feature map by multiplying the feature value of each feature position among each one-dimensional projection vector and the corresponding geometric weight and then calculate the sum (i.e., the reweighting process).

Here, the above-described association process formula is as follows:

$$y_i = b + \sum_{m=1}^{M} w_{c,m} W_{f,m} x_{n(m,i)}$$

Here, w, h are the size of the convolution kernel filter, c is the input coordinate, I, O are the number of input and output channels of the convolution process, $W_f$ is the weight of the learned convolution kernel, x and y are the input and output features, $W_c$ is the calculated distance weight, M is a convolutional kernel weight matrix of size w×h, and n(m,i) is the index of the m-th neighborhood associated with the output position i.

In an embodiment of the present disclosure, based on the feature information and the position information, obtaining a pose identification result of the target includes: obtaining normal vector feature information of each point in the depth image; obtaining a corresponding fusion feature by feature-stitching the normal vector feature information, feature information, and position information; and obtaining a pose identification result of the target based on the fusion feature information.

Figure 6:
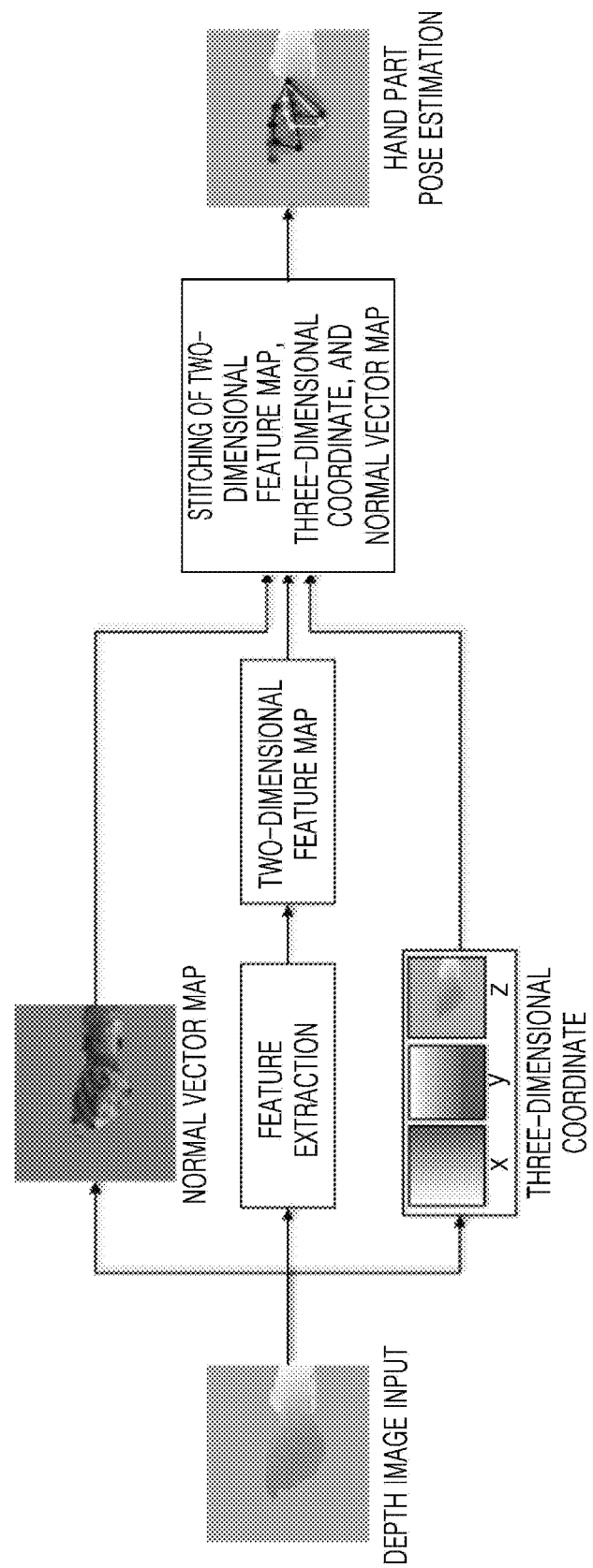
FIG. 6 is a diagram illustrating feature stitching in an example of an embodiment of the present disclosure.

Specifically, as shown in FIG. 6, while simultaneously obtaining feature information (i.e., 2D feature map) corresponding to the depth image and position information corresponding to feature information (i.e., 3D coordinates), normal vector feature information (i.e., normal vector map) of each point in the depth image is obtained, and stitching is performed on the above three, so that a fusion feature having more 3D expression capability can be obtained. The above-mentioned feature stitching calculation formula is as follows:

$$y=[x,c,nv], x \in R^n, c \in R^3, nv \in R^3, y \in R_{n+6}$$

Here, x is the input high-dimensional abstract feature, the feature dimension is n, c is the input 3D coordinate feature, and nv is the input normal vector feature.

Figure 7:
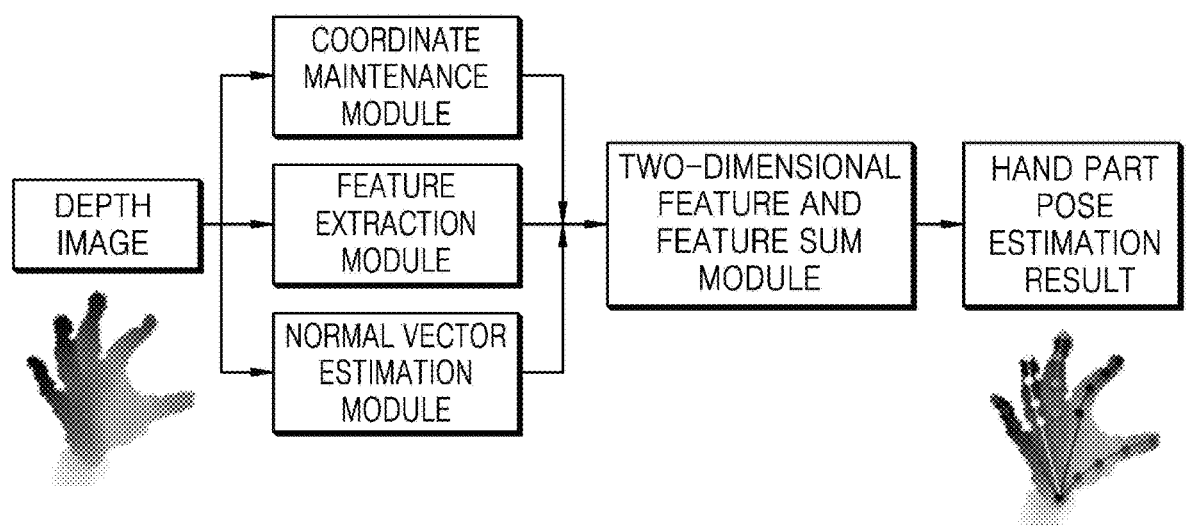
FIG. 7 is a diagram illustrating a structure of a pose identification system in an example of an embodiment of the present disclosure.

Furthermore, the pose identification method of the present disclosure may be implemented through the system shown in FIG. 7, and the system may include a coordinate maintenance module, a feature extraction module, a normal vector estimation module, and a 2D feature and a 3D feature fusion module, and the input may be a depth map, and the output may be a hand part pose estimation result.

The depth image may be obtained using a dedicated sensor, and may also be obtained through a stereo matching algorithm. A dense depth estimate can be obtained based on the depth of stereo matching. Most of the related art methods with high precision are depth-based learning network methods, but there are problems such as a large amount of computation in the existing associative algorithms and limited precision.

For the above-mentioned problem, in one embodiment of the present disclosure, obtaining a depth image of the target includes: obtaining a first image and a second image of a target; obtaining a minimum disparity map and a maximum disparity map corresponding to the first image and the second image by performing coarse matching on the first image and the second image; obtaining a matching search range corresponding to the minimum disparity map and the maximum disparity map based on the minimum disparity map and the maximum disparity map; obtaining a disparity map corresponding to the matching search range by performing fine matching on the first image and the second image based on the matching search range; and obtaining a depth image of the target based on the disparity map in the matching search range.

Figure 8:
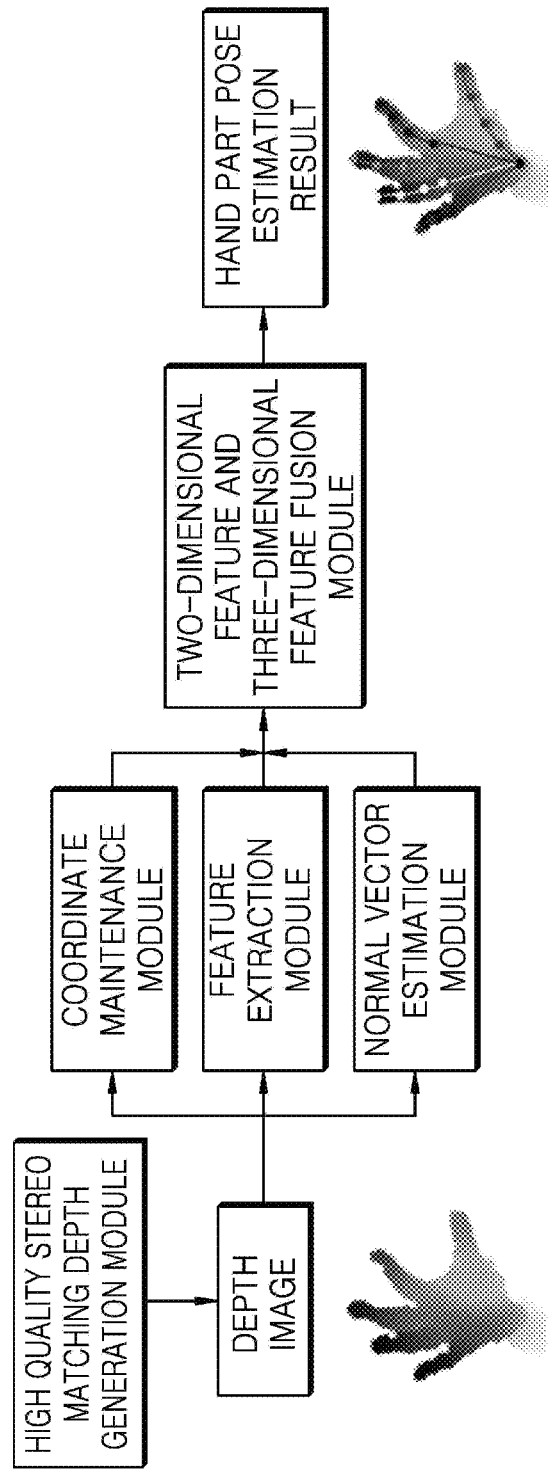
FIG. 8 is a diagram illustrating a structure of a pose identification system in an example of another embodiment of the present disclosure.

Furthermore, in relation to the stereo matching depth generation algorithm according to an embodiment of the present disclosure, it is possible to acquire a depth image with high precision by enhancing the initial image acquired by the sensor, and the pose identification method of the present disclosure may be implemented through the system shown in FIG. 8, and the system may include a depth sensor, a binocular stereo matching module, a coordinate maintenance module, a feature extraction module, a normal vector estimation module, and a 2D feature and a 3D feature fusion module, and the input may be a depth map collected by the depth sensor, and the output may be a hand part pose estimation result. The depth sensor and the binocular stereo matching module may be included in the high-precision stereo matching depth generation module.

Figure 9A:
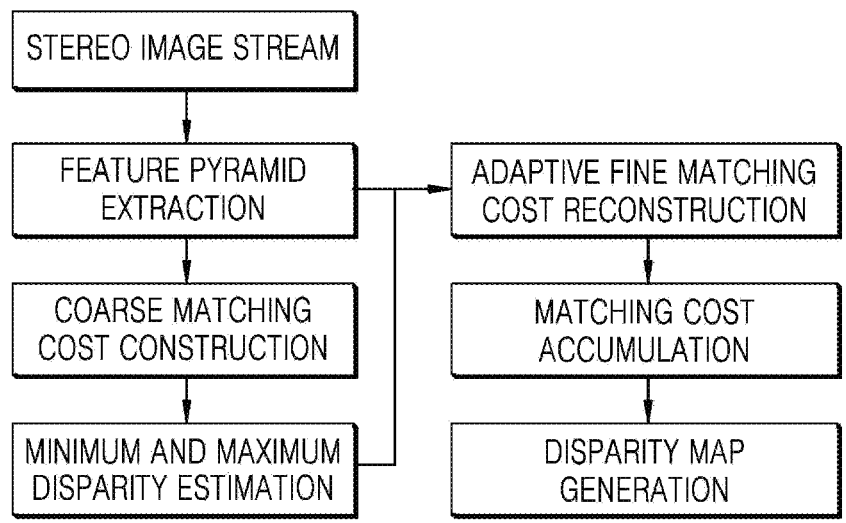
FIG. 9A is a diagram illustrating a stereo matching depth generation flow in an example of an embodiment of the present disclosure.
Figure 9B:
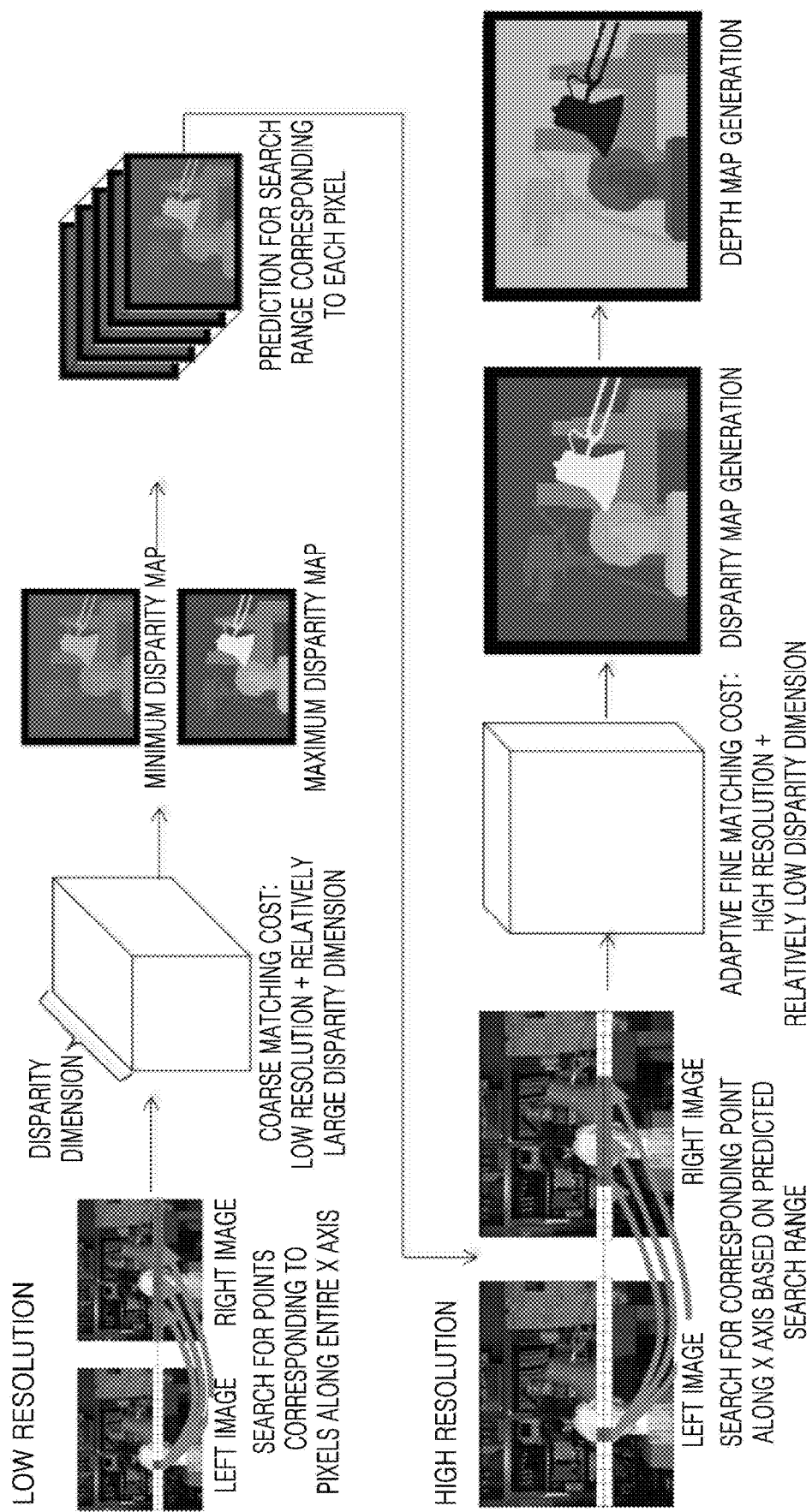
FIG. 9B is a diagram illustrating a depth image acquisition flow in an example of an embodiment of the present disclosure.

Specifically, FIG. 9A shows an overall flowchart of a high-precision stereo matching depth generation algorithm according to the present disclosure. Specifically, as shown in FIG. 9B, the pose identification apparatus first performs full-range matching using low-resolution pixel features and constructs a coarse matching cost, so that the identification apparatus can estimate a range in which each pixel of the left image corresponds in the right image, that is, the minimum and maximum disparity map, with reduced computational cost, and next, based on the obtained minimum and maximum disparity map, a search range corresponding to each pixel is obtained, and a matching cost between left and right pixels of a high-resolution pixel feature, that is, an adaptive fine matching cost, can be established, and thus, the full-range search can be avoided, and the memory consumption is greatly reduced, while the calculation is concentrated on the effective matching region, so that a high-resolution disparity map can be obtained. Finally, the obtained high-resolution disparity map may be converted into a high-resolution depth image.

The above-described minimum and maximum disparity estimation will be described in detail below.

Stereo matching-based disparity estimation is to find a pixel correspondence between two images within a disparity range. Most of the related art methods select one fixed disparity range, and perform dense disparity sampling within the range to obtain a high-precision output, and this results in huge memory requirements. Some methods first use the low-resolution disparity prediction result to narrow the range of disparity candidates, but the exact matching disparity may not exist within this range.

For this reason, according to an embodiment of the present disclosure, a minimum disparity and maximum disparity prediction method is provided, and a disparity range of each pixel is adaptively adjusted, and the range can cover the actual disparity of almost all pixels. Even when the predicted search space is too large, another problem, that is, a problem in which an accurate disparity value cannot be sampled because the disparity interval is too large, may be caused. For this reason, according to an embodiment of the present disclosure, a discretization strategy based on probability is provided, not a uniform discretization strategy. That is, the pose identification apparatus performs fine division in a section with high probability, and performs coarse division in a section with low probability. Specifically, in an embodiment of the present disclosure, the network is divided into two operations: The first operation is to process the low resolution matching cost, and the minimum disparity and maximum disparity of each pixel can be predicted. Then, by using a discretization strategy based on probability, the sample disparity of each pixel in the candidate range is obtained, and the second operation is to build an adaptive matching cost, which has the advantages of high resolution and low capacity consumption. An embodiment of the present disclosure may use a stacked hourglass network structure to process a matching cost and obtain a final disparity map.

Figure 10:
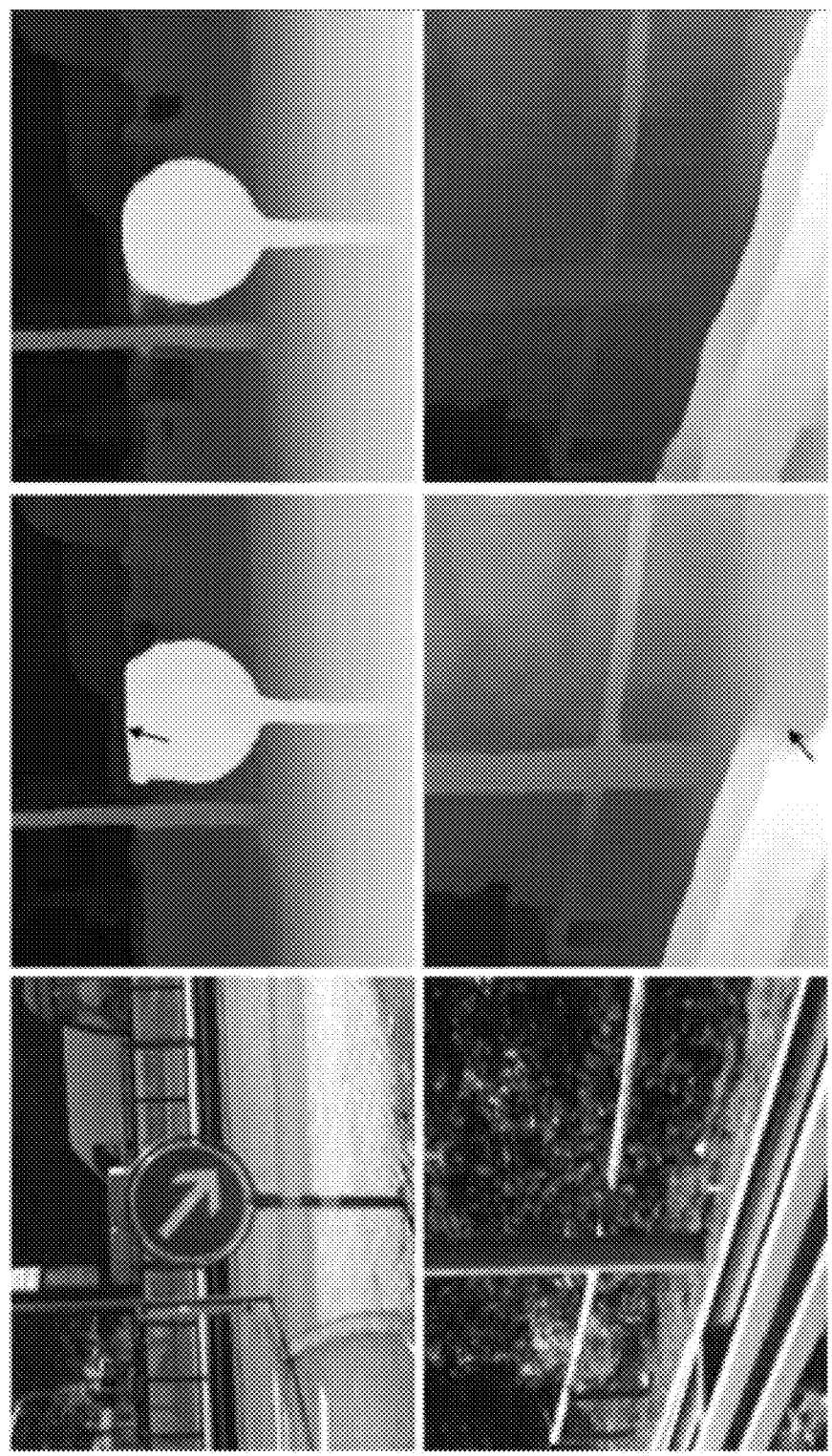
FIG. 10 is an expected disparity map of a cascade-based matching cost network, according to an embodiment of the present disclosure.

As shown in FIG. 10, the left is a color image, the middle is the disparity value predicted by the cascade matching cost network of a fixed narrow range, and the right is the disparity value predicted by the method according to an embodiment of the present disclosure. Here, an exact matching disparity in such a region, for example, a boundary and overlapping texture region, is not within a narrow disparity candidate range, and may cause an error in the disparity value, but a method according to an embodiment of the present disclosure solves this problem.

Figure 11A:
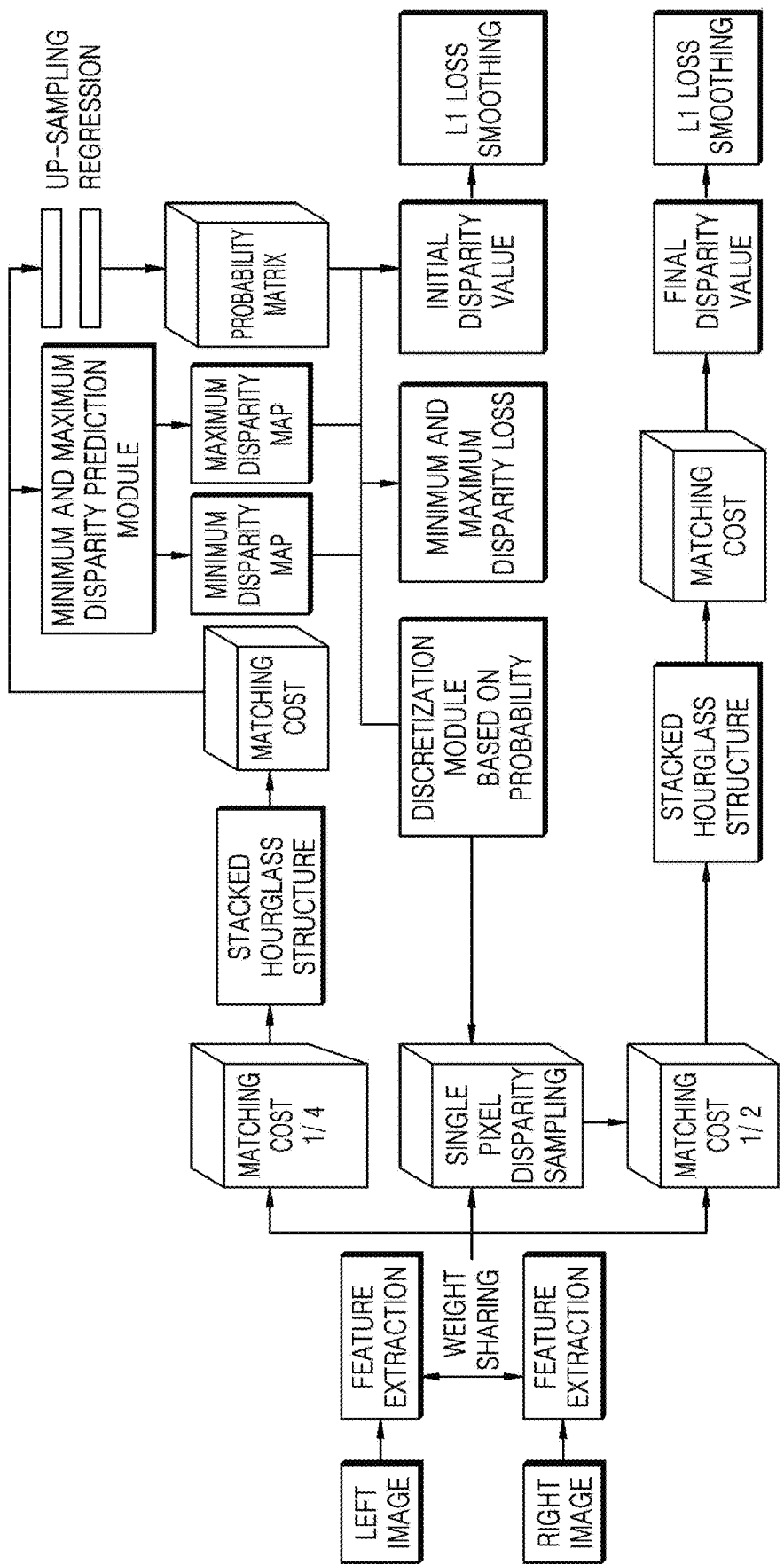
FIG. 11A is a diagram illustrating a structure of a matching cost network including two operations, according to an embodiment of the present disclosure.

FIG. 11A shows a network structure diagram according to an embodiment of the present disclosure, and the network including two operations according to an embodiment of the present disclosure predicts a disparity map using a cascade method from a low resolution to a high resolution. First, the network uses a feature extractor to extract multi-scale features, and the resolution corresponding to each scale is 1/16 and 1/4 of the original input image. Next, the network may construct a low-resolution matching cost using 1/16 low-resolution features, predict a minimum disparity value and a maximum disparity value through the disparity prediction network, and obtain a candidate disparity range of each pixel. In addition, an embodiment of the present disclosure may obtain disparity sampling by discretizing a disparity value using a probability-based discretization strategy in a candidate disparity range. Based on the disparity sampling and 1/4 high-resolution feature map, a high-resolution matching cost can be constructed. Then, the final high-resolution disparity can be obtained using the stacked hourglass network structure.

Figure 11B:
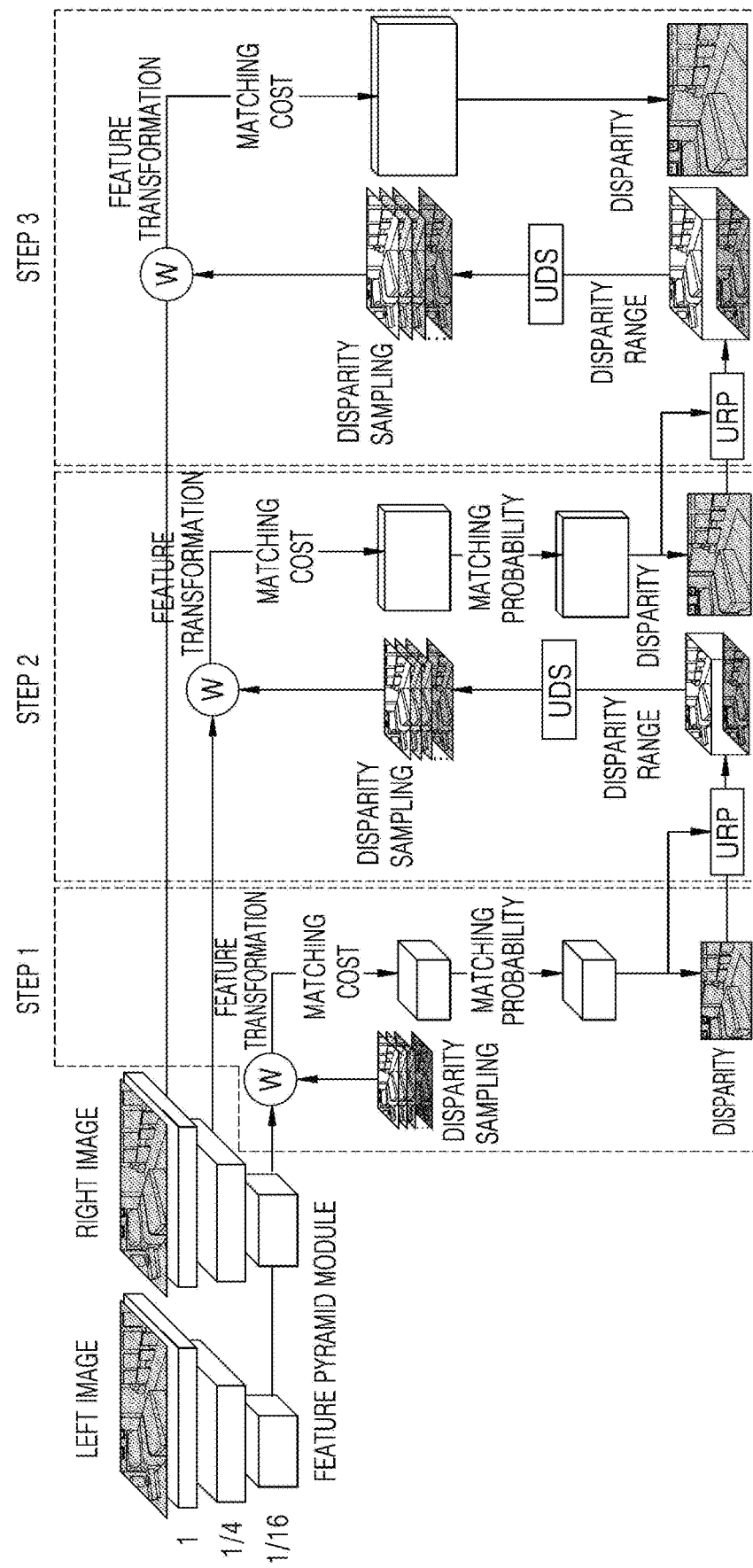
FIG. 11B is a diagram illustrating a structure of a matching cost network including three operations, according to an embodiment of the present disclosure.

FIG. 11B shows a network structure diagram including three operations according to an embodiment of the present disclosure, and the spatial resolution of the matching cost of each operation increases from 1/16, 1/14 to 1 times the size of the original input image. The network first extracts multi-scale features through the feature pyramid module. In the first operation, the network may first perform a full-range search using low-resolution pixel features to establish a coarse matching cost between left and right pixels. Then, the network may learn the matching probability from the matching cost to predict the disparity map of the corresponding resolution. In the second operation, the network transmits the upsampled disparity map and matching probability through uncertainty distribution-guided range prediction (URP) and uncertainty-based disparity sampler (UDS) to generate a new disparity sampling. The network may predict the disparity map by establishing a high-resolution matching cost based on the disparity sampling. In the last operation, the network may establish a full-resolution matching cost and predict a full-resolution disparity map.

Hereinafter, the discretization strategy and network output and loss functions from the disparity prediction network are described in detail.

(1) Disparity Prediction Network

In a coarse-to-fine stereo matching scheme, the majority of operations are extended based on the early predicted disparity, so that the next level of disparity range is obtained, but the extended space for each pixel is the same. Substantially, the disparity range of each pixel can be adaptively inferred using more information from the previous operation. For this reason, the embodiment of the present disclosure may predict the minimum and maximum disparity of each pixel by providing a minimum and maximum disparity prediction network.

First, based on the matching cost built in the first operation, matching cost is processed using three-dimensionally stacked 3D hourglass structure, and next, as two 3D convolutions are applied to the matching cost, it is possible to be reduced from a 4D matrix (height H*width W*feature dimension C*disparity dimension D) to a 3D matrix (height H*width W*disparity dimension D). Finally, the matching cost can be transformed into a probability matrix using the softmax function.

As shown in FIGS. 12A to 12D, the probability distributions according to the disparity dimension are not the same. For non-texture regions or non-overlapping texture regions, they usually have multiple matching pixels, so that the pixel's cost distribution tends to have a few small peaks. For occlusion regions, they do not have matching pixels, so that the probability distribution of pixels tends to be flat. For a pixel with only one matching position, the probability distribution is very steep. Due to this, the disparity range of each pixel can be inferred using the relationship between disparity sampling and its probability distribution.

Figure 13A:
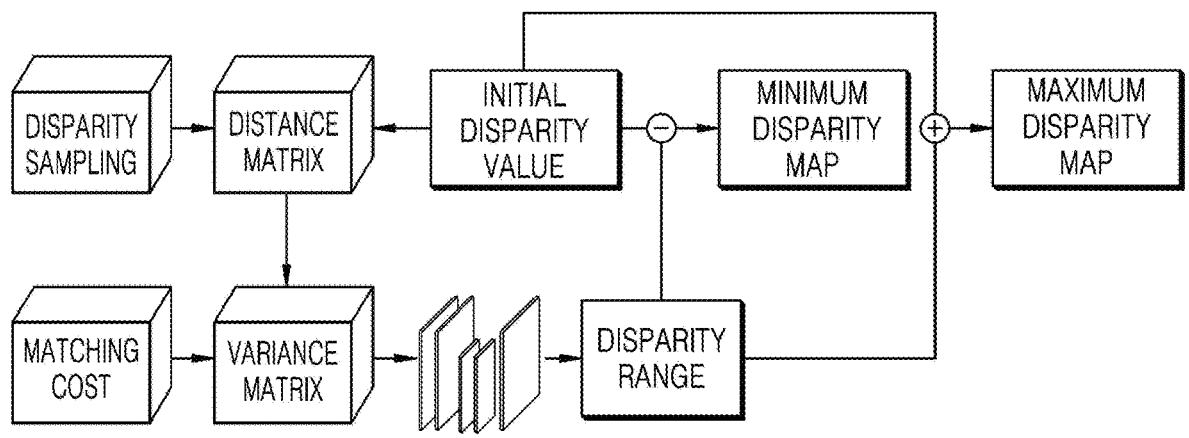
FIG. 13A is a diagram illustrating a structure of a minimum and maximum disparity prediction network according to an embodiment of the present disclosure.

Specifically, as shown in FIG. 13A, the minimum and maximum disparity prediction network of the embodiment of the present disclosure may take a matching cost, a sampling disparity, and an initial disparity value as inputs. First, a distance matrix between the sampled disparity and the original disparity value is calculated; then, a variance distance is obtained by multiplying the distance matrix by the matching cost; and then, using a specific codec structure, the variance matrix can be input and the disparity range of each pixel can be output. Here, the estimation of the disparity range of each pixel is an important component of the minimum and maximum disparity prediction network, and the network may automatically adjust the disparity range of each pixel based on the distribution of variance. The minimum disparity map is obtained by subtracting the disparity map range map from the initial disparity map, and the maximum disparity map may be obtained by adding the initial disparity map and the disparity range map to each other.

Figure 13B:
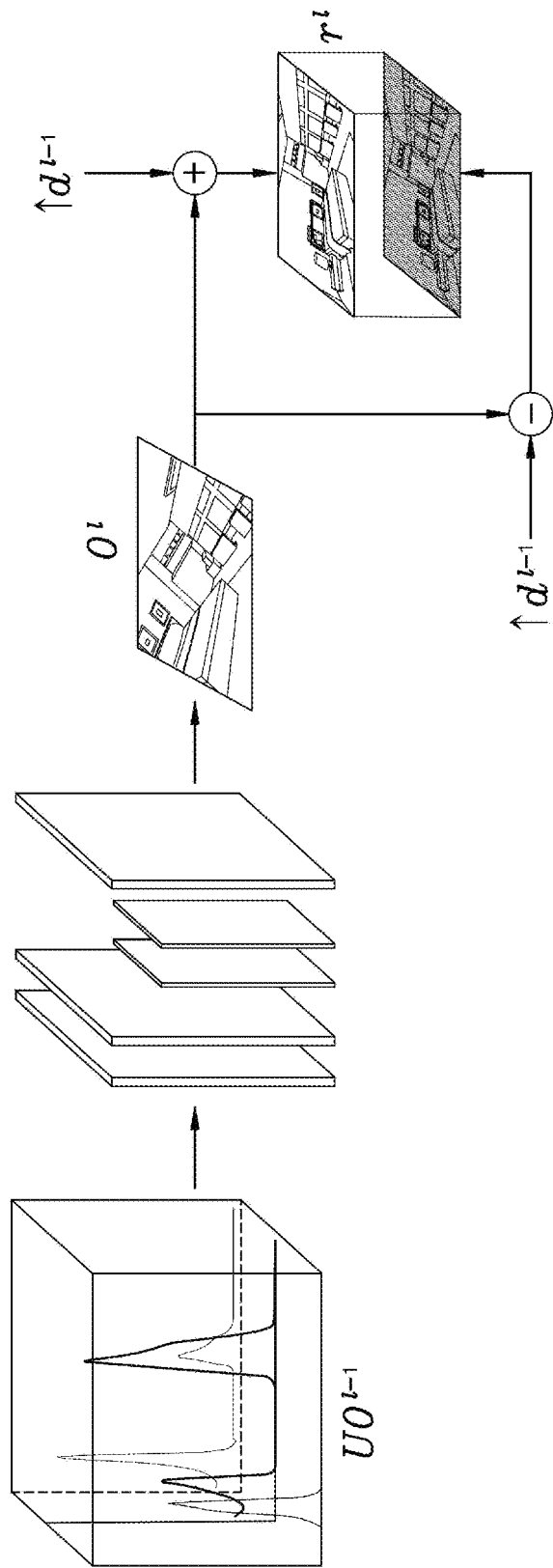
FIG. 13B is a diagram illustrating a structure of a guided range prediction network based on indeterminate distribution, according to an embodiment of the present disclosure.

FIG. 13B illustrates a structure of a range prediction network guided based on indeterminate distribution according to another embodiment of the present disclosure. The network takes as input each pixel's offset matrix $uo^{l-1}$ based on uncertainty, and the corresponding value is obtained by multiplying the probability matrix (H*W*D) and the offset matrix (H*W*D) of each pixel, and here, the offset matrix may be calculated from the amount of offset (disparity dimension D) between the disparity value predicted in the first operation by each pixel and the disparity sampling point. Then, using a specific codec structure, an offset matrix $uo^{l-1}$ based on uncertainty may be input, and the offset amount $o^l$ of each pixel may be output. Then, the lower boundary of the disparity range $r^l$ may be obtained by subtracting the offset amount $o^l$ through the initial (original) disparity map, and the upper boundary of the disparity range $r^l$ may be obtained by adding the initial disparity map and the offset amount $o^l$. The specific offset matrix $vo^{l-1}$ may be calculated as follows:

$$uo^{l-1}(s_i^{l-1})=p^{l-1}(s_i^{l-1})+(s_s^{l-1}-d^{u-1})^2$$

Here, $s_i^{l-1}$ and $d^{l-1}$ indicate a disparity sampling point and a disparity value predicted in the previous operation, and $p^{l-1}$ indicates a probability matrix, and l indicates an operation number.

(2) Discretization Strategy

In order to predict a more accurate result, an embodiment of the present disclosure uses a high-resolution feature structure high-resolution matching cost. However, higher spatial resolution may be accompanied by a larger disparity dimension, which may increase computational amount and memory cost. In order to solve this problem, the disparity dimension may be lowered, and the disparity dimension may be set to a fixed number, which may be 8 times or more smaller than the normal method. Specifically, the conventional stereo matching method sets the disparity dimension of the full-resolution matching cost to 192, and the disparity dimension of the matching cost of ¼ resolution is 96, which may be set to 12. In order to reduce the disparity dimension without reducing precision, the disparity hypothesis range of each pixel may be adaptively reduced, and the range may be calculated by subtracting the predicted minimum disparity map from the maximum disparity map predicted by the previous module.

However, another problem arises when the search space is too large. That is, the disparity candidate is too coarse so that the correct disparity cannot be sampled. Due to this, for pixels whose prediction range is larger than a certain value, an embodiment of the present disclosure uses a discretization strategy based on probability rather than a uniform discretization strategy, and relatively fine discretization is performed in an interval with a relatively high probability. For pixels whose prediction range is less than a certain value, a uniform discretization strategy may be used.

Figure 14A:
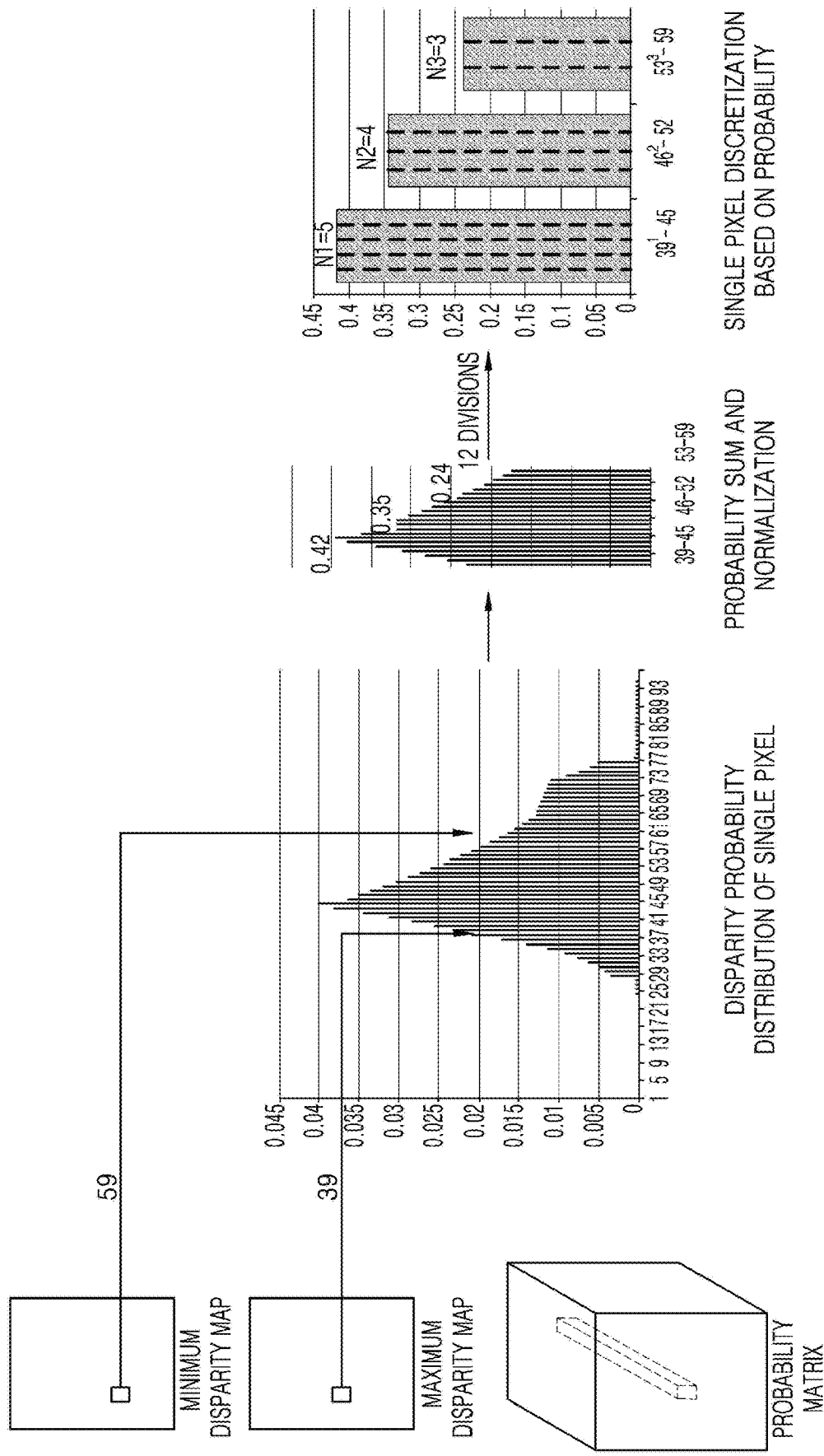
FIG. 14A is a diagram illustrating a flow of a probability-based discretization strategy according to an embodiment of the present disclosure.

Here, FIG. 14A shows a discretization strategy obtained based on probability, and taking a single pixel i as an example, first, its minimum disparity value, its maximum disparity value, and its probability distribution are obtained. Next, the disparity range is equally divided into three sub-regions si1, si2 and si3. Next, the probability of each sub-region is calculated with the following formula:

$$P_{ij} = P(d_j < d < _{j+1})$$

Here, $d_j$ and $d_{j+1}$ are the upper and lower bounds of the sub-region $s_{ij}$, $P(\ )$ is a probability distribution function, and $p_{ij}$ is the probability that the disparity value of pixel i is within the range of $d_j$ to $d_{j+1}$ section.

The disparity interval of each sub-region is calculated by the following formula:

$$k_{ij} = d_{sub\text{-}interval}(P_{ij} \times N)$$

Here, $k_{ij}$ is the disparity sampling interval of sub-region $s_{ij}$, $d_{sub\text{-}interval}$ is the region range of sub-region $s_{ij}$, and N is the total number of samples.

At each operation, the disparity sample of each sub-region is calculated with the following formula:

$$d_{ijl} = = s_{ij} + l \times k_{ij}, l \in [0, (p_{ij}) \times N)]$$

Here, $d_{ijl}$ is a disparity sample of sub-region $s_{ij}$.

After disparity samples of all sub-regions are merged again, a final disparity sample is obtained.

Figure 14B:
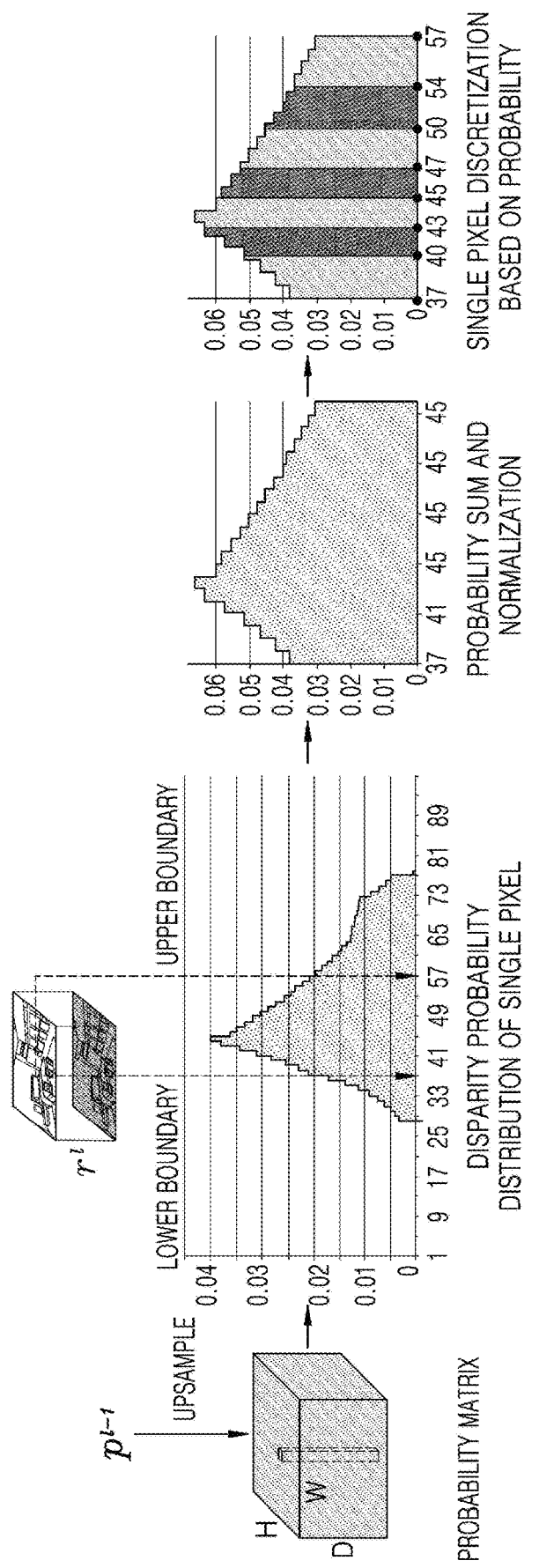
FIG. 14B is a diagram illustrating a discretization strategy based on uncertainty, according to an embodiment of the present disclosure.

In addition, an embodiment of the present disclosure further proposes a more commonly used discretization strategy, and referring to FIG. 14B, this may be referred to as a discretization strategy based on uncertainty. Taking a single pixel i as an example, first, a disparity probability distribution of a single pixel in a probability matrix may be obtained, and then the probabilities within the disparity range may be truncated and normalized. Then, starting from the lower boundary of the disparity range, if the area of the cumulative probability histogram reaches i/N−1 correspondingly (here, i=0,1, . . . , N−1), each endpoint is considered as a parity sample $s_i$. Finally, N disparity samples $s_0, s_1, \ldots, s_{N-1}$ may be obtained. In this way, the disparity sample of the high-resolution region may be denser. The specific cumulative probability calculation is expressed by the following formula:

$$\text{if } p(d \le d_{k-1}) < \frac{i}{N-1} \le p(d \le d_k);$$

$$s_i = r_{k-1} + \frac{\frac{i}{N-1} - p(d \le d_{k-1})}{p(d_k)},$$

$$i = 1, 2, \ldots, N-1, k = 1, 2, \ldots, d_{max} - d_{min}$$

Here, $p(d \le d_{k-1})$ indicates the probability for a single pixel, that is, the probability that the disparity value is within the section range $d_{k-1}$ from $d_{min}$, and $d_{min}$ and $d_{max}$ indicate the lower boundary and the upper boundary of the predicted disparity range.

(3) Network Output and Loss Functions

The network is divided into two operations, and each operation includes 4 modules in total: an hourglass pre-module and 3 stacked hourglass modules. Each module generates one 4D matching cost, and the predicted disparity map is obtained through the disparity regression function, and the formula is as follows:

$$\hat{d} = \sum_{d=0}^{d_{max}} d \times \sigma(-c_d)$$

Here, $\hat{d}$ is the predicted disparity value, d is the sample disparity, $c_d$ is the matching cost, and $\sigma(\ )$ is the sigmoid function.

In addition, for the first operation, the minimum and maximum disparity prediction network may output a minimum disparity map and a maximum disparity map. During the training process, all branches of the network may output a disparity map, and backpropagation may be performed through loss calculation. During the test period, the last branch of the last stage outputs the disparity map. At the same time, regardless of the training operation or the test operation, the last one branch will both output the minimum disparity map and the maximum disparity map.

A network is trained on the Scene Flow and KITTI datasets, and the network can be trained using pixel error EPE, and the formula is as follows:

$$EPE(d_{gl}, \hat{d}) = \text{Smooth}_{L_1}(d_{gl} - \hat{d})$$

Here, $\hat{d}$ is the predicted disparity value, $d_{gt}$ is the actual disparity value, and the definition of the $\text{Smooth}_{L1}$ function is as follows:

$$\text{Smooth}_{L_1}(x) = \begin{cases} 0.5x^2, & \text{if } |x| < 1 \\ |x| - 0.5, & \text{if } |x| \ge 1 \end{cases}$$

The network according to the embodiment of the present disclosure is divided into two operations, and each operation includes all four modules, thereby outputting a total of eight predicted disparity values. The total disparity loss function is defined as:

$$l_{disp} = \sum_{i=1}^{2} \sum_{j=1}^{4} \lambda_{ij} \cdot EPE\left(d_{gt}^i, \hat{d}^i\right)$$

Here, $\lambda_{ij}$ is a weight coefficient.

For minimum and maximum disparity prediction networks, minimum and maximum disparity loss may be applied. The loss may include two parts: a relaxation loss and an absolute loss. Here, the relaxation loss allows the disparity range to be large enough to cover the actual disparity, but the absolute loss can ensure an accurate sampling interval by making the coverage range small enough so that the correct sample value is not omitted during the sampling process.

Accordingly, in order to cover the actual disparity, the predicted minimum disparity value must be smaller than the actual disparity value, and the predicted actual disparity value must be greater than the actual disparity value. Therefore, for the predicted minimum disparity map, if the prediction result is smaller than the actual disparity, the relaxation loss offers a relatively small penalty; and if the prediction result is greater than the actual disparity, a relatively large penalty constraint may be employed. Accordingly, the relaxation loss is induced to be larger than the actual disparity value for the predicted maximum disparity map.

$$l_{relax\_min} = \begin{cases} \lambda_1 \cdot \sum_i (d_{gt}(i) - d_{tolo}(i)), & \text{if } d_{max}(i) \le d_{gt}(i) \\ \lambda_2 \cdot \sum_i (d_{min}(i) - d_{gt}(i)), & \text{if } d_{min}(i) > d_{gt}(i) \end{cases}$$

$$l_{relax\_max} = \begin{cases} \lambda_1 \cdot \sum_i (d_{max}(i) - d_{gt}(i)), & \text{if } d_{gt}(i) \le d_{max}(i) \\ \lambda_2 \cdot \sum_i (d_{gt}(i) - d_{max}(i)), & \text{if } d_{gt}(i) > d_{max}(i) \end{cases}$$

Here, $\lambda_1$ and $\lambda_2$ are weight coefficients, $d_{gt}$ is an actual disparity value, $d_{min}$ is a predicted minimum disparity value, and $d_{max}$ is a predicted maximum disparity value.

At the same time, an absolute loss function can be used so that the predicted disparity range is small enough.

$$l_{absolute\_min} = \text{Smooth}_{L_1}(d_{gt} - d_{min})$$

$$l_{absolute\_max} = \text{Smooth}_{L_1}(d_{gt} - d_{max})$$

The final minimum and maximum losses are as follows:

$$l_{min\_max\_loss} = \lambda_{relax} \cdot (l_{relax\_min} + l_{relax\_max}) + \lambda_{absolute} \cdot (l_{absolute\_min} + l_{absolute\_max})$$

Here, $\lambda_{relax}$ and $\lambda_{absolute}$ are weight coefficients.

Finally, the loss function of any network is as follows:

$$L = l_{min\_max\_loss} + l_{disp}$$

Figure 15:
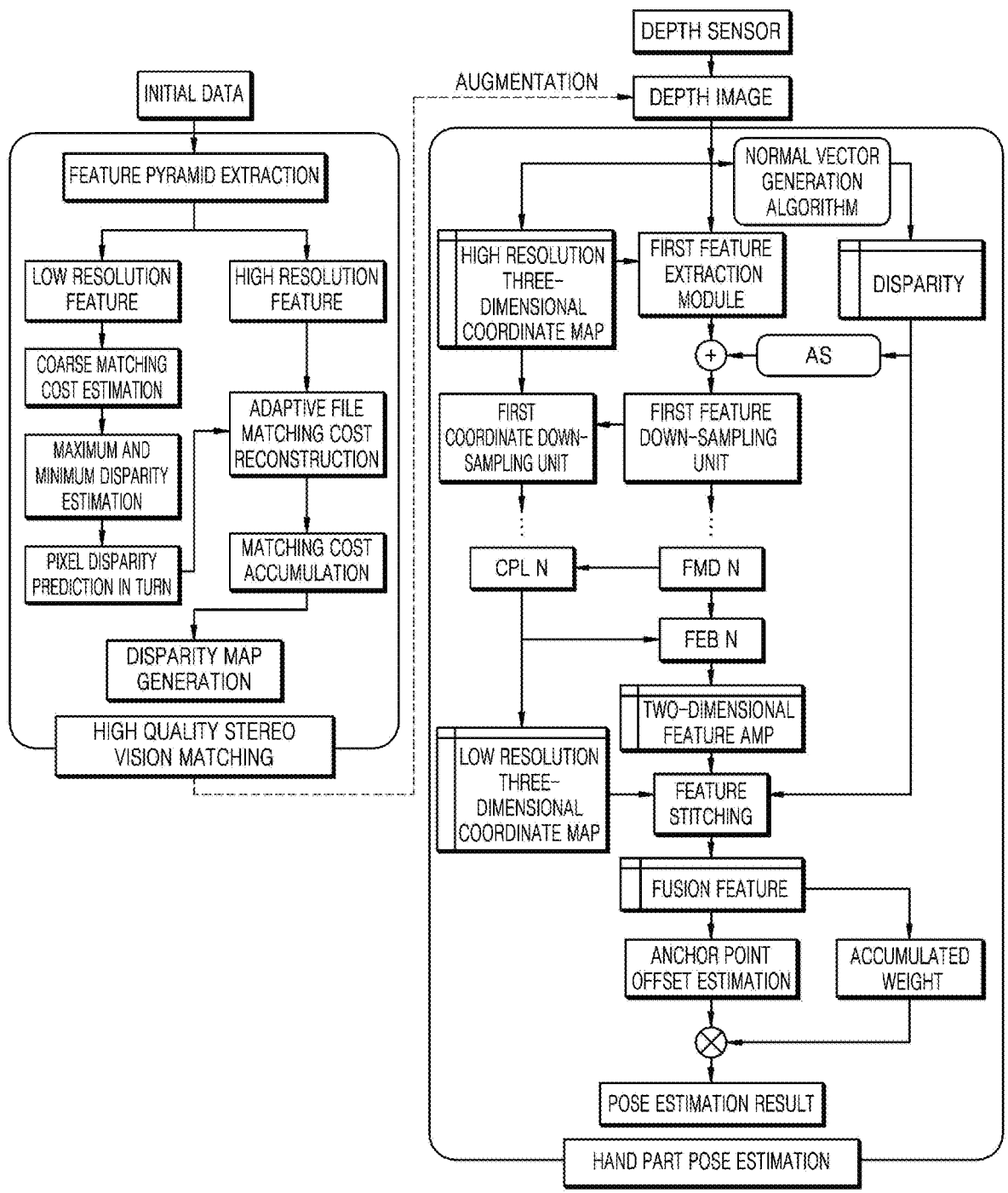
FIG. 15 is a diagram illustrating a flowchart of a pose identification method in an example of an embodiment of the present disclosure.

Next, a method of an embodiment of the present disclosure will be described through an example of performing hand part pose identification through a hand part pose identification network. The overall flow may include the following operations, as shown in FIG. 15.

The original depth image including the hand part is acquired through the depth sensor, and by using the above-described stereo matching-based depth generation algorithm, a high-precision depth image corresponding to the original depth image in which the original depth image is enhanced is obtained. The obtained depth image is input to a pose identification network, and in the network, a corresponding high-resolution coordinate map and a corresponding normal vector are obtained based on the depth image. Feature information (i.e., 2D feature) corresponding to the depth image is extracted using a plurality of Feature Extractor Blocks (FEBs) and Feature Map Downsamples (FMDs), and, coordinate down-sampling is performed simultaneously with feature down-sampling by using a plurality of coordinate down-sampling units, that is, a Coordinate Preserving Layer (CPL), and position information (i.e., a low-resolution 3D coordinate map) corresponding to the feature information is obtained, and a fusion feature is obtained by performing feature stitching on a 2D feature, a 3D coordinate map, and a normal vector, and by estimating the anchor point offset based on the fusion feature, the pose identification result is obtained, thereby completing the hand part pose estimation.

Figure 16:
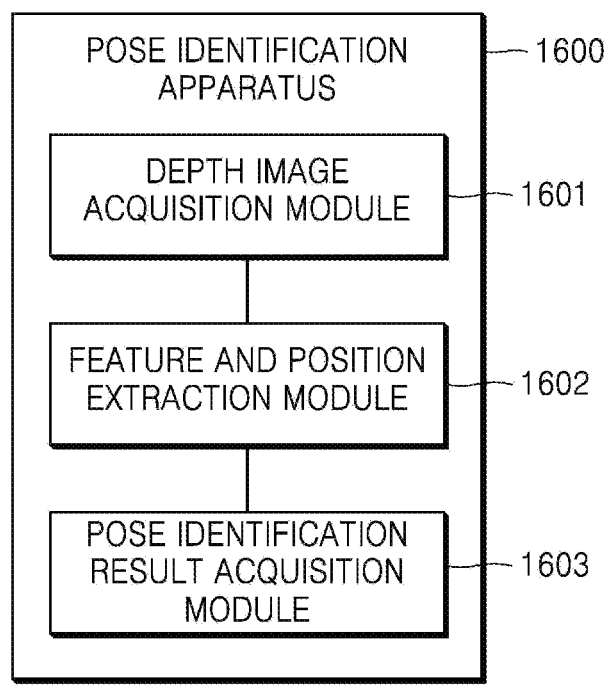
FIG. 16 is a structural block diagram of a pose identification apparatus according to an embodiment of the present disclosure.

FIG. 16 is a structural block diagram of a pose identification apparatus according to an embodiment of the present disclosure. As shown in FIG. 16, a pose identification apparatus 1600 includes a depth image acquisition module 1601, a feature and position acquisition module 1602, and a pose identification result acquisition module 1603.

The depth image acquisition module 1601 is used to acquire a depth image of the target.

The feature and position acquisition module 1602 is used to acquire feature information of the depth image and position information corresponding to the feature information.

The pose identification result obtaining module 1603 is used to acquire a pose identification result of the target based on the feature information and the position information.

According to the scheme provided by the present disclosure, by obtaining the feature information of the depth image and obtaining the position information corresponding to the feature information at the same time, during the process of pose identification, in the feature information, specific position information corresponding to the features of each position can be fully utilized, and the precision of pose identification is improved.

In an embodiment of the present disclosure, the feature and position acquisition module specifically: obtains, based on the depth image, an initial 3D coordinate map corresponding to the depth image; obtains feature information by performing feature extraction on the depth image at least once, and feature down-sampling on the depth image at least once based on a corresponding cumulative weight; and obtains position information by performing coordinate down-sampling on the first 3D coordinate map based on the accumulated weight corresponding to the feature down-sampling each time feature down-sampling is performed.

In an embodiment of the present disclosure, the pose identification apparatus further includes a cumulative weight acquisition module, and the cumulative weight acquisition module obtains the cumulative weight corresponding to the feature of each position in the input feature map corresponding to the feature down-sampling based on the input feature map corresponding to the feature down-sampling and the down-sampling information corresponding to the feature down-sampling, each time feature down-sampling is performed.

In an embodiment of the present disclosure, the feature and position acquisition module further: obtains a 3D distance corresponding to a feature of each position in the input feature map, based on the 3D coordinate map corresponding to the input feature map corresponding to the feature extraction; obtains a distance weight corresponding to the feature of each position in the input feature map based on the 3D distance; and obtains an output feature map corresponding to the input feature map by performing feature extraction on the input feature map based on the distance weight.

In an embodiment of the present disclosure, the depth image acquisition module specifically: obtains a first image and a second image of a target; obtains a minimum disparity map and a maximum disparity map corresponding to the first image and the second image by performing coarse matching on the first image and the second image; obtains a matching search range corresponding to the first image and the second image based on the minimum disparity map and the maximum disparity map; obtains a disparity map corresponding to the matching search range by performing fine matching on the first image and the second image based on the matching search range; and obtains a depth image of the target based on the disparity map in the matching search range.

In an embodiment of the present disclosure, the pose identification result obtaining module specifically: obtains normal vector feature information of each point in the depth image; obtains a corresponding fusion feature by feature-stitching the normal vector feature information, feature information, and position information; and obtains a pose identification result of the target based on the fusion feature information.

Figure 17:
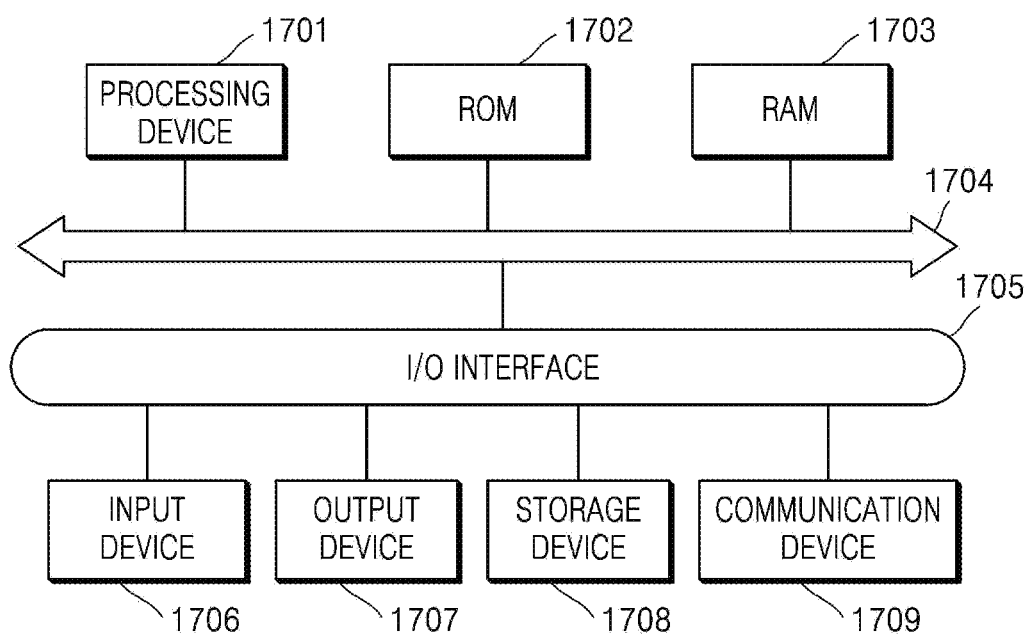
FIG. 17 is a diagram illustrating a structure of an electronic device according to an embodiment of the present disclosure.

Referring to FIG. 17, a structural diagram of an electronic device 1700 (e.g., a terminal device or server of the method shown in FIG. 1) for implementing an embodiment of the present disclosure is shown. In an embodiment of the present disclosure, the electronic device may include cell phones, notebooks computers, digital broadcast receivers, personal digital assistants (PDAs), tablet computers (PADs), portable multimedia players (PMPs), vehicle terminals (e.g., car navigation terminals), mobile terminals such as wearable devices, and fixed terminals such as digital TVs and desktop computers, but the present disclosure is not limited thereto. The electronic device shown in FIG. 17 is merely an example, and should not limit the function and usage scope of the embodiment of the present disclosure.

The electronic device includes a memory and a processor, and here, the memory is used to store a program for executing the method described in each of the above-described method embodiments, and the processor is configured to execute the program stored in the memory. Here, the processor may be referred to as a processing device 1701 described below, and the memory may include at least one of read-only memory (ROM) 1702, random access memory (RAM) 1703, and storage device 1708, and may be represented as follows.

As shown in FIG. 17, the electronic device 1700 may include a processing device 1701 (e.g., a central processing unit, a graphics processor, etc.), and the processing device 1701 executes various suitable operations and processing based on the programs loaded into the RAM 1703 from the ROM 1702 or the storage device 1708. Various programs and data for the operation of the electronic device 1700 are also stored in the RAM 1703. The processing device 1701, the ROM 1702, and the RAM 1703 are connected to each other via a bus 1704. An input/output (I/O) interface 1705 is also connected to the bus 1704.

Generally, an input device 1706 such as a touch screen, a touch pad, a keyboard, a mouse, a camera, a microphone, an accelerometer, a gyroscope, and the like; an output device 1707 including, for example, a liquid crystal display (LCD), a speaker, and a vibration device; a storage device 1708 including magnetic tape, hard disk, and the like; and a device such as communication device 1709 may be connected to the I/O interface 1705. The communication device 1709 may enable the electronic device 1700 to exchange data by performing wireless or wired communication with another device. Although FIG. 17 shows an electronic device having various devices, it should be understood that it is not necessary to implement or have all of the illustrated devices. Alternatively, more or fewer devices may be implemented or provided.

In particular, according to embodiments of the present disclosure, the process described above with reference to the flowchart may be implemented as a computer software program. For example, embodiments of the present disclosure include a computer program product including a computer program stored on a non-transitory computer-readable medium, and the computer program includes program code for executing the method shown in the flowchart. In such an embodiment, the computer program may be downloaded and installed from a network through the communication device 1709, installed from the storage device 1708, or installed from the ROM 1702. When the computer program is executed by the processing device 1701, the above-described functions defined in the method of the embodiment of the present disclosure may be executed.

The computer-readable storage medium described above in the present disclosure may be a computer-readable signal medium or a computer-readable storage medium, or any combination of the two. A computer-readable storage medium may be, for example, an electrical, magnetic, optical, electromagnetic, infrared or semiconductor system, device or component, or any combination thereof, but the present disclosure is not limited thereto. A more specific example of a computer-readable storage medium includes electrical connections with one or more wires, portable computer disks, hard disks, random access memory (RAM), read-only memory (ROM), erasable programmable read-only memory (EPROM) or flash memory, optical fiber, portable compact disk read-only memory (CD-ROM), optical storage, magnetic storage, or any suitable combination of the above, but the present disclosure is not limited thereto. In the present disclosure, a computer-readable storage medium may be any type of medium including or storing a program, and the program may be used by or in combination with an instruction execution system, apparatus, or component. In the present disclosure, a computer-readable signal medium may include a data signal propagated as a part of a baseband or carrier wave, and a computer-readable program code is mounted therein. This propagated data signal includes an electromagnetic signal, an optical signal, or any suitable combination of the above, but may take many forms that are not limited thereto. A computer-readable signal medium may also be any computer-readable medium other than a computer-readable storage medium. A computer readable signal medium may transmit, propagate, or send a program for use by or in combination with an instruction execution system, apparatus, or component. The program code included in the computer readable medium includes wired, optical cable, radio frequency (RF), or any suitable combination thereof, but may be transmitted by any suitable medium that is not limited thereto.

In some embodiments, a client and a server may communicate with currently known or future research and development network protocols such as HyperText Transfer Protocol (HTTP), and may be interconnected with digital data communication (e.g., a communication network) in any form or medium. Examples of telecommunication networks include local area networks (LANs), wide area networks (WANs), the Internet, end-to-end networks (such as ad hoc end-to-end networks), and networks currently known or to be researched and developed in the future.

The above-described computer-readable medium may be included in the above-described electronic device, and may exist alone without being assembled in the electronic device.

One or more programs are loaded on the above-mentioned computer readable medium, and when the above one or more programs are executed by an electronic device, the electronic device: obtains a depth image of the target; obtains feature information of the depth image and position information corresponding to the feature information; and based on the feature information and position information, obtains the target pose identification result.

The computer program code used to perform the tasks of this application program may be written in one or more programming languages or a combination thereof. The mentioned programming languages include object-oriented programming languages, but are not limited thereto, and may include conventional procedural programming languages such as Java, Smalltalk, C++ and "C" languages or similar programming languages. The program code may be executed entirely on the user's computer, or may be partly executed on the user's computer; or may be executed as a standalone software package, or may be executed partly on a remote computer, or may be executed entirely on a remote computer or server. In the case of a remote computer, the remote computer may be connected to a user's computer, or may be connected to an external computer through any kind of network including a local area network (LAN) or a wide area network (WAN) (e.g., using an Internet service provider to deliver an Internet connection).

The flowchart and block diagrams in the drawings illustrate possible implementations of system architectures, functions, and operations of systems, methods, and computer program products according to various embodiments of the present disclosure. In this regard, each block in the flowchart or block diagram may represent a module, program segment, or portion of code, and a module, program segment, or portion of code may include one or more for realizing specified logical functions. Further, in some alternative implementations, the functions indicated in the blocks may occur in an order different from the order indicated in the drawings. For example, two blocks marked consecutively may actually be executed substantially in parallel and sometimes in reverse order depending on the function involved. Further, each block in the block diagrams and/or flowcharts and combinations of blocks in the block diagrams and/or flowcharts may be implemented by a dedicated hardware-based system that performs a specified function or task, and may be realized by a combination of dedicated hardware and computer instructions.

Modules or units related to the embodiments described in the present disclosure may be implemented in software or hardware. Here, the name of a module or unit does not constitute a restriction on the unit itself in any particular situation, and for example, the depth image acquisition module may also be described as "a module for obtaining a depth image".

The functions described above may be performed at least in part by one or more hardware logic components. For example, the example types of hardware logic components that can be used without limitation may include Field Programmable Gate Array (FPGA), Application Specific Integrated Circuit (ASIC), Application Specific Standard Product (ASSP), System on Chip (SOC), Programmable Logical Device (CPLD), and the like.

In the context of this disclosure, a machine-readable medium may be a tangible medium that can include or store a program for use by or in combination with an instruction execution system, apparatus, or device. The machine-readable medium may be a machine-readable signal medium or a machine-readable storage medium. A machine-readable storage medium may be, for example, an electrical, magnetic, optical, electromagnetic, infrared or semiconductor system, device or apparatus, or any combination thereof, but the present disclosure is not limited thereto. More specific examples of machine-readable storage media may include electrical connections based on one or more wires, portable computer disks, hard drives, random access memory (RAM), read-only memory (ROM), erasable programmable read-only memory (EPROM), or may include flash memory, optical fiber, portable compact disk read-only memory (CD-ROM), optical storage, magnetic storage, or any suitable combination thereof.

An apparatus provided in an embodiment of the present disclosure may be implemented as at least one of multiple modules through an AI model. Functions related to AI can be performed through non-volatile memory, volatile memory, and processors.

A processor may include one or more processors. In this case, one or more processors may be a general-purpose processor such as a central processing unit (CPU), an application processor (AP), and the like, or a pure graphics processing unit such as a graphics processing unit (GPU), a visual processing units (VPU), and the like, and/or an AI-only processor such as a neural processing unit (NPU).

The one or more processors control the processing of input data according to predefined operating rules or artificial intelligence (AI) models stored in non-volatile and volatile memories. The one or more processors control the processing of input data according to predefined working rules or artificial intelligence (AI) models stored in non-volatile and volatile memories.

Here, providing through learning means obtaining an AI model having a predefined operation rule or a desired characteristic by applying a learning algorithm to a plurality of learning data. Such learning may be performed on the device itself in which the AI according to the embodiment is executed and/or may be implemented as a separate server/system.

AI models can include multiple neural network layers. Each layer has multiple weight values, and the calculation of one layer is performed based on the calculation results of the previous layer and multiple weights of the current layer. Examples of neural networks include convolutional neural network (CNN), deep neural network (DNN), recurrent neural networks (RNN), restricted Boltzmann machine (RBM), deep belief networks (DBN), bidirectional loop depth neural network (BRDNN), generative adversarial network (GAN), and depth Q network, but the present disclosure is not limited thereto.

A learning algorithm is a method of making, allowing, or controlling a predetermined target device (e.g., a robot) to determine or predict a target device by training a predetermined target device (e.g., a robot) using a plurality of training data. Examples of learning algorithms include supervised learning, unsupervised learning, unsupervised learning, or reinforcement learning, but the present disclosure is not limited thereto.

Those skilled in the art can clearly understand that the specific method implemented when the above-described computer-readable medium is executed by an electronic device for convenience and conciseness of description may refer to the corresponding process in the above-described method embodiment, so that redundant description is omitted here.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pose identification method comprising:
   obtaining a depth image of a target;
   obtaining feature information of the depth image by performing, on the depth image, feature extraction and feature down-sampling;
   obtaining position information corresponding to the feature information by performing coordinate down-sampling simultaneously with the feature down-sampling based on a cumulative weight corresponding to a feature of each position in an input feature map corresponding to the feature down-sampling; and
   obtaining a pose identification result of the target based on the feature information and the position information.

2. The pose identification method of claim 1, wherein the obtaining of the feature information of the depth image and the position information corresponding to the feature information comprises:
   obtaining an initial three-dimensional coordinate map corresponding to the depth image;
   obtaining the feature information by preforming the feature down-sampling based on an accumulated weight; and
   obtaining the position information by performing the coordinate down-sampling on the initial three-dimensional coordinate map, based on the accumulated weight corresponding to the feature down-sampling.

3. The pose identification method of claim 2, further comprising:
   obtaining the cumulative weight based on the input feature map corresponding to the feature down-sampling and down-sampling information corresponding to the feature down-sampling.

4. The pose identification method of claim 3, wherein the performing of the feature extraction comprises:
   obtaining a three-dimensional distance corresponding to a feature of each position in the input feature map, based on a three-dimensional coordinate map corresponding to an input feature map corresponding to the feature extraction;
   obtaining a distance weight corresponding to the feature of each position in the input feature map based on the three-dimensional distance; and
   obtaining an output feature map corresponding to the input feature map by performing feature extraction on the input feature map based on the distance weight.

5. The pose identification method of claim 1, wherein the obtaining of the depth image of the target comprises:
   obtaining a first image and a second image of the target;
   obtaining a minimum disparity map and a maximum disparity map corresponding to the first image and the second image by performing coarse matching on the first image and the second image;
   obtaining a matching search range corresponding to the minimum disparity map and the maximum disparity map based on the minimum disparity map and the maximum disparity map;
   obtaining a disparity map corresponding to the matching search range by performing fine matching on the first image and the second image based on the matching search range; and
   obtaining the depth image of the target based on the disparity map corresponding to the matching search range.

6. The pose identification method of claim 1, wherein the obtaining of the pose identification result of the target based on the feature information and the position information comprises:
   obtaining normal vector feature information of each point in the depth image;
   obtaining a corresponding fusion feature by feature-stitching the normal vector feature information, the feature information, and the position information; and
   obtaining the pose identification result of the target based on the fusion feature.

7. A pose identification apparatus comprising:
   a processor configured to:
     acquire a depth image of a target;
     acquire feature information of the depth image by performing, on the depth image, feature extraction and feature down-sampling;
     acquire position information corresponding to the feature information by performing coordinate down-sampling simultaneously with the feature down-sampling based on a cumulative weight corresponding to a feature of each position in an input feature map corresponding to the feature down-sampling; and
     acquire a pose identification result of the target based on the feature information and the position information.

8. The pose identification apparatus of claim 7, wherein the processor, when obtaining of the feature information of the depth image and the position information corresponding to the feature information, is configured to:
   obtain an initial three-dimensional coordinate map corresponding to the depth image;
   obtain the feature information by performing the feature down-sampling based on an accumulated weight; and
   obtain the position information by performing the coordinate down-sampling on the initial three-dimensional coordinate map, based on the accumulated weight corresponding to the feature down-sampling.

9. The pose identification apparatus of claim 8, wherein the processor is further configured to:
   obtaining the cumulative weight based on the input feature map corresponding to the feature down-sampling and down-sampling information corresponding to the feature down-sampling.

10. The pose identification apparatus of claim 9, wherein the processor, when performing of the feature extraction, is configured to:
    obtain a three-dimensional distance corresponding to a feature of each position in the input feature map, based on a three-dimensional coordinate map corresponding to an input feature map corresponding to the feature extraction;
    obtain a distance weight corresponding to the feature of each position in the input feature map based on the three-dimensional distance; and
    obtain an output feature map corresponding to the input feature map by performing feature extraction on the input feature map based on the distance weight.

11. The pose identification apparatus of claim 7, wherein the processor, when obtaining of the depth image of the target, is configured to:
    obtain a first image and a second image of the target;
    obtain a minimum disparity map and a maximum disparity map corresponding to the first image and the second image by performing coarse matching on the first image and the second image;

obtain a matching search range corresponding to the minimum disparity map and the maximum disparity map based on the minimum disparity map and the maximum disparity map;

obtain a disparity map corresponding to the matching search range by performing fine matching on the first image and the second image based on the matching search range; and obtain the depth image of the target based on the disparity map corresponding to the matching search range.

12. The pose identification apparatus of claim 7, wherein the processor, when obtaining of the pose identification result of the target based on the feature information and the position information, is configured to:

obtain normal vector feature information of each point in the depth image;

obtain a corresponding fusion feature by feature-stitching the normal vector feature information, the feature information, and the position information; and obtain the pose identification result of the target based on the fusion feature information.

13. An electronic device comprising:
a memory; and
a processor,
wherein the memory stores a computer program,
wherein the processor is configured to execute the computer program to:
obtain a depth image of a target;
obtain feature information of the depth image by performing, on the depth image, feature extraction and feature down-sampling;
obtain position information corresponding to the feature information by performing coordinate down-sampling simultaneously with the feature down-sampling based on a cumulative weight corresponding to a feature of each position in an input feature map corresponding to the feature down-sampling; and
obtain a pose identification result of the target based on the feature information and the position information.

14. A non-transitory computer-readable medium storing a computer program that, when executed by a processor, causes the processor to:
obtain a depth image of a target;
obtaining feature information of the depth image by performing, on the depth image, feature extraction and feature down-sampling;
obtaining position information corresponding to the feature information by performing coordinate down-sampling simultaneously with the feature down-sampling based on a cumulative weight corresponding to a feature of each position in an input feature map corresponding to the feature down-sampling; and
obtain a pose identification result of the target based on the feature information and the position information.

15. The non-transitory computer-readable medium of claim 14, wherein the computer program, when causing the processor to obtain the feature information of the depth image and the position information corresponding to the feature information, causes the processors to:
obtain an initial three-dimensional coordinate map corresponding to the depth image;
obtain the feature information by performing the feature down-sampling based on an accumulated weight; and
obtain the position information by performing the coordinate down-sampling on the initial three-dimensional coordinate map, based on the accumulated weight corresponding to the feature down-sampling.

16. The non-transitory computer-readable medium of claim 15, wherein the computer program is further configured to cause the processor to:
obtaining the cumulative weight based on the input feature map corresponding to the feature down-sampling and down-sampling information corresponding to the feature down-sampling.

17. The non-transitory computer-readable medium of claim 16, wherein the program, when causing the processors to perform the feature extraction, causes the processor to:
obtain a three-dimensional distance corresponding to a feature of each position in the input feature map, based on a three-dimensional coordinate map corresponding to an input feature map corresponding to the feature extraction;
obtain a distance weight corresponding to the feature of each position in the input feature map based on the three-dimensional distance; and
obtain an output feature map corresponding to the input feature map by performing feature extraction on the input feature map based on the distance weight.

18. The non-transitory computer-readable medium of claim 15, wherein the computer program, when causing the processor to perform the feature extraction, causes the processor to:
obtain a three-dimensional distance corresponding to a feature of each position in the input feature map, based on a three-dimensional coordinate map corresponding to an input feature map corresponding to the feature extraction;
obtain a distance weight corresponding to the feature of each position in the input feature map based on the three-dimensional distance; and
obtain an output feature map corresponding to the input feature map by performing feature extraction on the input feature map based on the distance weight.

19. The non-transitory computer-readable medium of claim 14, wherein the program, when causing the processor to obtain the depth image of the target, causes the processor to:
obtain a first image and a second image of the target;
obtain a minimum disparity map and a maximum disparity map corresponding to the first image and the second image by performing coarse matching on the first image and the second image;
obtain a matching search range corresponding to the minimum disparity map and the maximum disparity map based on the minimum disparity map and the maximum disparity map;
obtain a disparity map corresponding to the matching search range by performing fine matching on the first image and the second image based on the matching search range; and
obtain the depth image of the target based on the disparity map corresponding to the matching search range.

20. A pose identification method comprising:
obtaining a depth image of a target object;
obtaining a coordinate map of the depth image;
obtaining feature information of the depth image by performing, on the depth image, feature extraction and feature down-sampling;
obtaining position information corresponding to the feature information by performing coordinate down-sampling on the coordinate map simultaneously with the feature down-sampling based on a cumulative weight corresponding to a feature of each position in an input feature map corresponding to the feature down-sampling;

identifying a correspondence between a position in the depth image and a position in the feature information; and obtaining a pose identification of the target object, based on identifying the correspondence between the position in the depth image and the position in the feature information.

* * * * *